(12) United States Patent
Yamada et al.

(10) Patent No.: US 7,772,356 B2
(45) Date of Patent: Aug. 10, 2010

(54) INFRARED ABSORPTION FILTER

(75) Inventors: Masahiro Yamada, Osaka (JP);
Tsuyoshi Fujiki, Osaka (JP); Shinichi Kawasaki, Osaka (JP); Mitsuaki Yamada, Osaka (JP); Takatsune Yanagida, Chiyoda-ku (JP); Masatoshi Ando, Chiyoda-ku (JP); Yoshihiko Imanaka, Chiyoda-ku (JP)

(73) Assignee: Osaka Gas Co., Ltd., Osaka (JP)

( * ) Notice: Subject to any disclaimer, the term of this patent is extended or adjusted under 35 U.S.C. 154(b) by 664 days.

(21) Appl. No.: 11/665,799

(22) PCT Filed: Oct. 19, 2005

(86) PCT No.: PCT/JP2005/019651

§ 371 (c)(1),
(2), (4) Date: Apr. 19, 2007

(87) PCT Pub. No.: WO2006/043715

PCT Pub. Date: Apr. 27, 2006

(65) Prior Publication Data

US 2007/0293606 A1  Dec. 20, 2007

(30) Foreign Application Priority Data

Oct. 21, 2004 (JP) .............................. 2004-307486

(51) Int. Cl.
*C08G 64/00* (2006.01)
*C08G 63/02* (2006.01)

(52) U.S. Cl. ........................... 528/196; 524/88; 524/90; 524/612; 525/148; 525/168; 528/198; 528/271; 528/272

(58) Field of Classification Search .................. 524/88, 524/90, 612; 525/148, 168; 528/196, 198, 528/271, 272
See application file for complete search history.

(56) References Cited

U.S. PATENT DOCUMENTS

| 4,310,652 | A | * | 1/1982 | DeBona et al. | ............. 528/125 |
| 4,835,081 | A | * | 5/1989 | Ong et al. | ................ 430/58.25 |
| 5,196,479 | A | * | 3/1993 | Laughner et al. | ............. 525/67 |
| 5,208,299 | A | * | 5/1993 | Bales et al. | ................ 525/437 |
| 5,486,577 | A | * | 1/1996 | Farah et al. | ................ 525/469 |
| 6,255,031 | B1 | | 7/2001 | Yoa et al. | |
| 2007/0293606 | A1 | * | 12/2007 | Yamada et al. | ................ 524/88 |

FOREIGN PATENT DOCUMENTS

| JP | 11-073115 | | 3/1999 |
| JP | 11073115 | * | 3/1999 |
| JP | 11-116826 | | 4/1999 |
| JP | 11-302285 | | 11/1999 |
| JP | 11302285 | * | 11/1999 |
| JP | 2000-227515 | | 8/2000 |
| JP | 2002-82219 | | 3/2002 |
| JP | 2002082219 | * | 3/2002 |
| JP | 3308545 | | 5/2002 |
| JP | 2002-341132 | * | 11/2002 |
| WO | WO 9207721 | * | 5/1992 |
| WO | 97/38855 | | 10/1997 |
| WO | WO 9738855 | * | 10/1997 |
| WO | WO 99/54399 | * | 10/1999 |

* cited by examiner

*Primary Examiner*—Terressa M Boykin
(74) *Attorney, Agent, or Firm*—Wenderoth, Lind & Ponack, L.L.P.

(57) ABSTRACT

The present invention discloses an infrared absorption filter which enables a coloring matter having infrared absorptivity to be contained or dispersed uniformly in a high concentration and has excellent durability, and an infrared absorption panel comprising this infrared absorption filter. The infrared absorption filter comprises a polycarbonate resin which contains 20 to 100 mol % of a recurring unit having a fluorene skeleton represented by the formula (1) and 0 to 80 mol % of a recurring unit represented by the formula (2), and a coloring matter having infrared absorptivity.

27 Claims, 2 Drawing Sheets

INFRARED ABSORPTION FILTER

TECHNICAL FIELD

The present invention relates to an infrared absorption filter containing a coloring matter having infrared absorptivity and to an infrared absorption panel comprising this infrared absorption filter.

BACKGROUND ART

A filter composed of glass having a deposited film thereon and a filter composed of phosphate glass containing metal ions are known as infrared absorption filters. However, these glass infrared absorption filters are heavy, easily broken and hard to be processed, for example, bent.

To overcome these defects, a plastic infrared absorption filter is now under study and many materials are proposed. For example, JP-A 2000-227515 (patent document 1) discloses an infrared absorption filter prepared by forming a coating layer made of a composition containing an infrared absorbing coloring matter dispersed in a binder resin on a base material, wherein the amount of the residual solvent in the laminate is 5.0 wt % or less. In this document, polyester-based resins, acrylic resins, polyamide-based resins, polyurethane-based resins, polyolefin-based resins and polycarbonate-based resins are enumerated as examples of the binder resin.

It is desired that the plastic infrared absorption filter should exhibit infrared absorptivity with a small film thickness. Therefore, the coloring matter contained in a thin film formed after the solvent is removed must be uniformly dispersed in the binder resin in a high concentration without being maldistributed, agglomerated and precipitated to the surface. Further, the coloring matter dispersed in the binder resin must retain durability for a long time, be free from a reaction with another coloring matter and not be deteriorated by the environment such as heat, light and moisture.

Since most coloring matters used as an infrared light absorber are very unstable to light, heat and water, the binder resin must serve as a protection layer for preventing the deterioration of the coloring matters. However, the above transparent resins which are well known as the binder resin are not satisfactory in terms of the above function, and various resins are proposed instead.

For example, JP-A 11-116826 (patent document 2) proposes use of a polyester resin containing a diol component having a specific structure in order to disperse a coloring matter stably in the resin. This document teaches that a polyester prepared by copolymerizing a diol having a fluorene skeleton may be used as the resin.

Japanese Patent No. 3308545 (patent document 3) discloses a multi-layer infrared absorption film which comprises an infrared absorption film containing an infrared absorbing coloring matter such as a phthalocyanine-based metal complex dispersed in a transparent polymer resin and a multi-layer infrared absorption film having at least one of an electromagnetic wave absorbing layer, an antireflective layer and an ultraviolet absorbing layer. In this document, copolyesters, polymethyl methacrylate, polystyrenes, amorphous polyolefins, polyisocyanates, polyacrylates and triacetyl celluloses are enumerated as examples of the polymer resin. A copolyester comprising 0.4 mol of dimethyl terephthalate, 0.88 mol of ethylene glycol and 0.28 mol of 9,9-bis(4-(2-hydroxyethoxy)phenyl)fluorene is used as the polymer resin (Example 1). However, it is desired to further improve the dispersibilities of these resins so that the infrared absorbing coloring matter can be dispersed uniformly in a high concentration. Also, there remains a problem with the durability of the obtained infrared absorption filter.

(Patent Document 1) JP-A 2000-227515

(Patent Document 2) JP-A 11-116826

(Patent Document 3) Japanese Patent No. 3308545

DISCLOSURE OF THE INVENTION

It is therefore an object of the present invention to provide an infrared absorption filter which enables a coloring matter having infrared absorptivity (may be referred to as "IRCM" hereinafter) to be contained or dispersed uniformly in a high concentration and has high durability as well as an infrared absorption panel comprising this infrared absorption filter.

The inventor of the present invention has found that when a polycarbonate resin having a specific structure with a fluorene skeleton is used in combination with IRCM, IRCM can be contained or dispersed in the polycarbonate resin uniformly in a high concentration without causing the agglomeration of the coloring matter and a reaction between coloring matters and IRCM can be kept stably for a long time without deterioration (environmental resistance). The present invention has been accomplished based on this finding.

That is, the present invention is an infrared absorption filter containing a polycarbonate resin having a fluorene skeleton (may be referred to as "FLPC" hereinafter) and a coloring matter having infrared absorptivity (IRCM), wherein the FLPC contains 20 to 100 mol % of a recurring unit represented by the following formula (1):

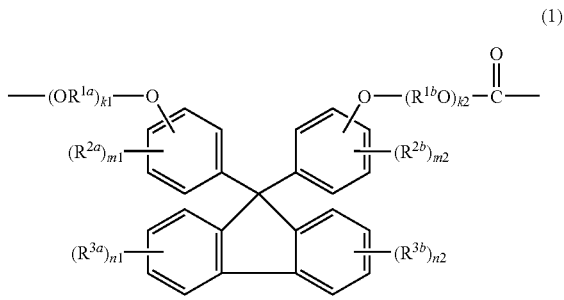

wherein $R^{1a}$ and $R^{1b}$ are the same or different and each an alkylene group having 2 to 10 carbon atoms, $R^{2a}$, $R^{2b}$, $R^{3a}$ and $R^{3b}$ are the same or different and each a hydrocarbon group having 1 to 10 carbon atoms or halogen atom, k1 and k2 are the same or different and each an integer of 0 to 2, and m1, m2, n1 and n2 are the same or different and each an integer of 0 to 4, and 0 to 80 mol % of a recurring unit represented by the following formula (2):

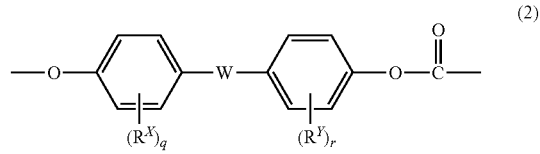

wherein $R^X$ and $R^Y$ are the same or different and each a hydrogen atom or alkyl group having 1 to 4 carbon atoms, q and r are each independently 1 or 2, and W is a single bond, alkylidene group having 1 to 5 carbon atoms, cycloalkylidene group having 5 to 10 carbon atoms or di(alkylidene having 1 to 3 carbon atoms)phenylene group.

The present invention includes an infrared absorption panel comprising the above infrared absorption filter.

The present invention is a method of improving the environmental resistance of an infrared absorption filter containing a resin having a fluorene skeleton and a coloring matter having infrared absorptivity, wherein a polycarbonate resin containing 20 to 100 mol % of a recurring unit represented by the above formula (1) and 0 to 80 mol % of a recurring unit represented by the above formula (2) is used as the resin having a fluorene skeleton.

The term "dispersion" as used herein means not only a state in which another substance is scattered as a fine particle composed of a plurality of molecules in a substance forming a single phase but also a state in which another substance is scattered as a single molecule in a substance forming a single phase, that is, a molten state.

EFFECT OF THE INVENTION

The infrared absorption filter of the present invention enables IRCM to be dispersed in FLPC uniformly in a high concentration and the agglomeration of the coloring matter and a reaction between the coloring matters to be suppressed when FLPC is used. Therefore, a film as thin as about several tens of μm can intercept infrared radiation and transmit visible radiation. Since IRCM is stabilized in FLPC, its deterioration by heat, light and water can be markedly suppressed and the infrared absorption filter of the present invention can keep stable performance for a long time. According to the present invention, there is provided an infrared absorption panel comprising this infrared absorption filter. Further, according to the present invention, the environmental resistance of the infrared absorption filter comprising a resin having a fluorene skeleton and a coloring matter having infrared absorptivity can be significantly improved.

BEST MODE FOR CARRYING OUT THE INVENTION

Figure 1:
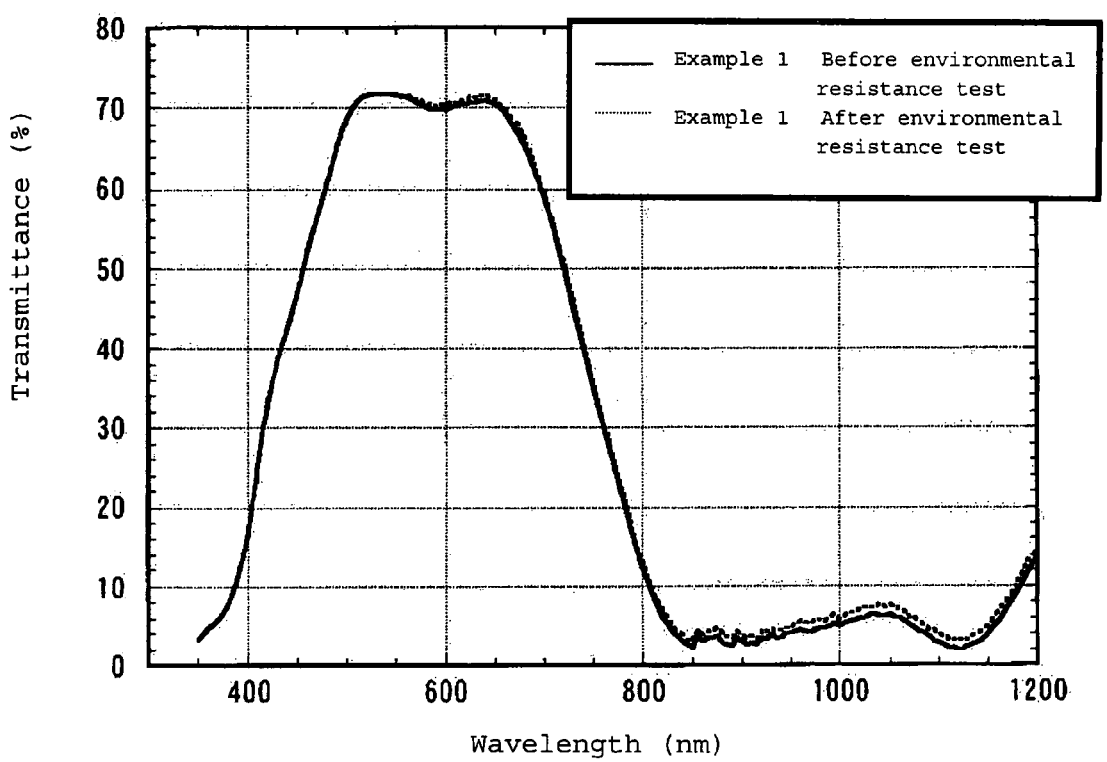
FIG. 1 shows the light transmission spectra before and after an environmental resistance test of the infrared absorption filter obtained in Example 1.

The infrared absorption filter of the present invention comprises FLPC and IRCM. IRCM is dispersed in FLPC.

<Polycarbonate Resin Having a Fluorene Skeleton>

The polycarbonate resin having a fluorene skeleton (FLPC) preferably contains 20 to 100 mol % of a recurring unit represented by the following formula (1) and 0 to 80 mol % of a recurring unit represented by the following formula (2).

(Recurring Unit Represented by the Formula (1))

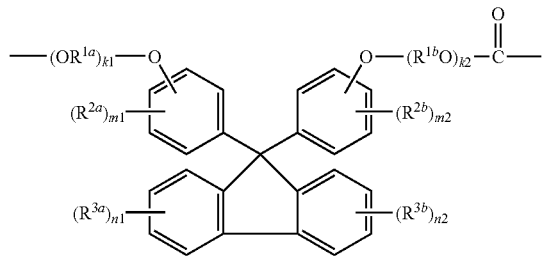

(1)

In the formula (1), $R^{1a}$ and $R^{1b}$ are the same or different and each an alkylene group having 2 to 10 carbon atoms, preferably alkylene group having 2 to 4 carbon atoms, more preferably ethylene group. Examples of $R^{1a}$ and $R^{1b}$ include ethylene group, trimethylene group, propylene group, butane-1,2-diyl group and butane-1,4-diyl(tetramethylene) group.

$R^{2a}$, $R^{2b}$, $R^{3a}$ and $R^{3b}$ are the same or different and each a hydrocarbon group having 1 to 10 carbon atoms or halogen atom. $R^{2a}$, $R^{2b}$, $R^{3a}$ and $R^{3b}$ are preferably an alkyl group having 1 to 10 carbon atoms, more preferably alkyl group having 1 to 4 carbon atoms. Examples of the alkyl group include methyl group, ethyl group, propyl group, isopropyl group, butyl group, s-butyl group, isobutyl group and t-butyl group. Examples of the halogen atom include fluorine atom, chlorine atom and bromine atom. The substitution positions of $R^{2a}$, $R^{2b}$, $R^{3a}$ and $R^{3b}$ are not particularly limited, and the substitution positions of $R^{2a}$ and $R^{2b}$ can be the 2- to 6-positions of a phenyl group according to the number m1 or m2 of substituents.

The recurring numbers k1 and k2 are the same or different and each an integer of 0 to 2, preferably 0 or 1. The substitution position of the group represented by —[O—($R^{1a}$)$_{k1}$—OH] or —[[O—($R^{1b}$)$_{k2}$—OH] can be selected from the 2- to 6-positions, preferably the 2- or 4-position, more preferably the 4-position of the phenyl group substituting the 9-position of fluorene.

The numbers m1 and m2 of substituents are the same or different and each an integer of 0 to 4, preferably an integer of 0 to 2, more preferably 0 or 1.

The numbers n1 and n2 of substituents are the same or different and each an integer of 0 to 4, preferably an integer of 0 to 2, more preferably 0.

In the formula (1), $R^{1a}$ and $R^{1b}$ are the same or different and each an alkylene group having 2 to 4 carbon atoms, $R^{2a}$, $R^{2b}$, $R^{3a}$ and $R^{3b}$ are the same or different and each an alkyl group having 1 to 10 carbon atoms, k1 and k2 are the same or different and each 0 or 1, and m1, m2, n1 and n2 are the same or different and each an integer of 0 to 2.

Preferably, in the formula (1), $R^{1a}$ and $R^{1b}$ are each an ethylene group, $R^{2a}$, $R^{2b}$, $R^{3a}$ and $R^{3b}$ are the same or different and each an alkyl group having 1 to 4 carbon atoms, k1 and k2 are the same or different and each 0 or 1, m1 and m2 are the same or different and each 0 or 1, and n1 and n2 are each 0.

Preferably, the recurring unit represented by the formula (1) has a structure represented by the following formula (1-1).

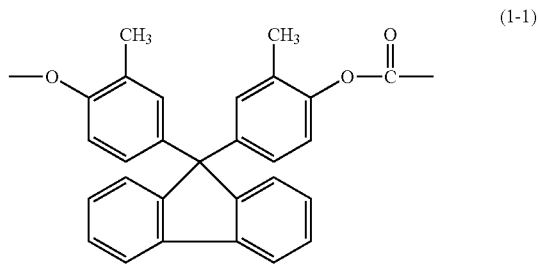

(1-1)

More preferably, the recurring unit represented by the above formula (1) has a structure represented by the following formula (1-2).

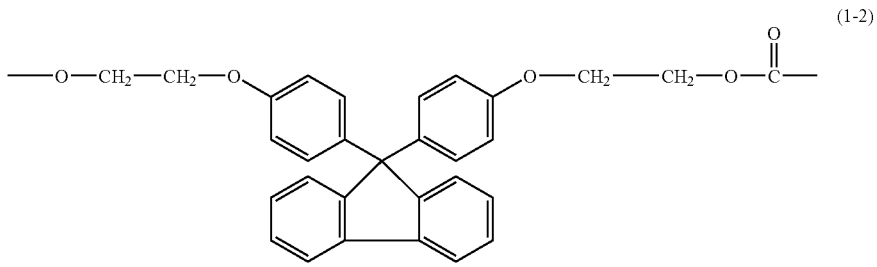

(1-2)

FLPC may have one or more recurring units represented by the formula (1). That is, FLPC may have a unit represented by the formula (1-1) as the unit having a fluorene skeleton. It may have both the unit of the formula (1-1) and the unit of the formula (1-2).

(Recurring Unit Represented by the Formula (2))

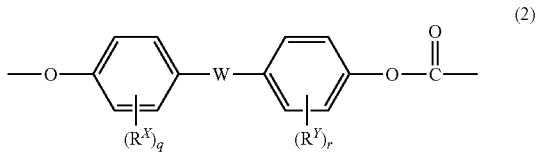

(2)

In the formula (2), $R^X$ and $R^Y$ are the same or different and each a hydrogen atom or alkyl group having 1 to 4 carbon atoms, preferably a hydrogen atom. Examples of the alkyl group having 1 to 4 carbon atoms include methyl group, ethyl group, propyl group, isopropyl group, butyl group, s-butyl group, isobutyl group and t-butyl group.

In the formula (2), q and r are each independently 1 or 2.

In the formula (2), W is a single bond, alkylidene group having 1 to 5 carbon atoms, cycloalkylidene group having 5 to 10 carbon atoms or di(alkylidene having 1 to 3 carbon atoms) phenylene group. Examples of the alkylidene group having 1 to 5 carbon atoms include methylidene group, ethylidene group, propylidene group, butylidene group and pentylidene group. Examples of the cycloalkylidene group having 5 to 10 carbon atoms include cyclopentylidene group, cyclohexylidene group, cycloheptylidene group and cyclooctylidene group. Examples of the di(alkylidene having 1 to 3 carbon atoms)phenylene group include di(ethylidene)phenylene group and di(propylidene)phenylene group.

Preferably, W in the formula (2) is a single bond, alkylidene group having 1 to 4 carbon atoms, cycloalkylidene group having 6 to 9 carbon atoms or di(alkylidene having 1 to 3 carbon atoms)phenylene group, and $R^X$ and $R^Y$ are each a hydrogen atom.

More preferably, W in the formula (2) is an isopropylidene group and/or a group represented by the following formula, and $R^X$ and $R^Y$ are each a hydrogen atom.

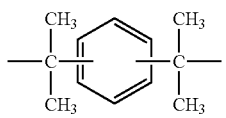

FLPC may be used alone or as a blend. For example, FLPC containing a recurring unit represented by the formula (1) or a blend of two or more FLPC's may be used. A blend of FLPC and another polycarbonate may also be used.

FLPC preferably has a fluorene skeleton in a relatively high ratio. For example, FLPC contains the recurring unit represented by the formula (1) in an amount of preferably 20 to 100 mol %, more preferably 30 to 100 mol %, much more preferably 40 to 100 mol %. It contains the recurring unit represented by the formula (2) in an amount of preferably 0 to 80 mol %, more preferably 0 to 70 mol %, much more preferably 0 to 60 mol %. Preferably, FLPC consists of 30 to 100 mol % of the recurring unit represented by the formula (1) and 0 to 70 mol % of the recurring unit represented by the formula (2).

As the content of the recurring unit represented by the formula (1) increases, IRCM can be dispersed more uniformly in a higher concentration advantageously. Thereby, the improvement of infrared absorptivity and the prevention of a reduction in visible transmittance can be both achieved efficiently with a small film thickness.

The viscosity average molecular weight of FLPC is preferably 5,000 to 100,000, more preferably 8,000 to 50,000, much more preferably 10,000 to 30,000. The viscosity average molecular weight (M) is obtained by inserting a specific viscosity ($\eta sp$) obtained from a solution prepared by dissolving FLPC in methylene chloride to a concentration of 0.7 g/dl at 20° C. into the following equation.

$$\eta sp/C = [\eta] + 0.45 \times [\eta]^2 C$$

$[\eta] = 1.23 \times 10^{-4} M^{0.83}$ (C is a resin concentration of 0.7)

When the viscosity average molecular weight is too low, the heat resistance of FLPC may lower. When the viscosity average molecular weight is too high, it may be difficult to synthesize FLPC and to melt knead FLPC when the infrared absorption filter of the present invention is to be manufactured by melt kneading. The solubility in a solvent of FLPC may lower when the infrared absorption filter of the present invention is to be manufactured by the casting or coating method.

The glass transition point (Tg) of FLPC is preferably 80 to 250° C., more preferably 100 to 200° C. When Tg is too low, the heat resistance of the infrared absorption filter of the present invention may lower and when Tg is too high, melt kneading may become difficult.

<Manufacture of FLPC>

FLPC can be obtained from a reaction between a diol component having a fluorene skeleton and a carbonate forming compound.

(Diol Component)

The diol component is preferably a compound represented by the following formula (3).

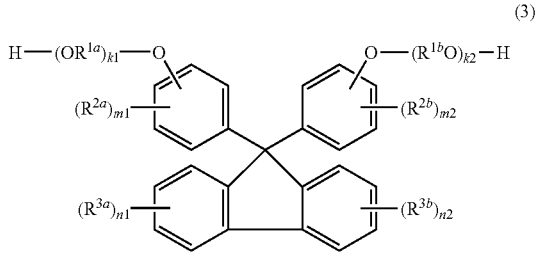

(3)

In the formula, $R^{1a}$, $R^{1b}$, $R^{2a}$, $R^{2b}$, $R^{3a}$, $R^{3b}$, k1, k2, m1, m2, n1 and n2 are as defined in the above formula (1).

Typical examples of the compound represented by the above formula (3) are given below.

(1) k1=k2=0 compound

Typical compounds represented by the above formula (3) in which k1=k2=0 are the following 9,9-bis(hydroxyphenyl)fluorenes.

The 9,9-bis(hydroxyphenyl)fluorenes include (i) 9,9-bis(4-hydroxyphenyl)fluorene; (ii) 9,9-bis(hydroxy-alkylphenyl)fluorenes: for example, 9,9-bis(4-hydroxy-mono$C_{1-6}$alkylphenyl)fluorenes such as 9,9-bis(4-hydroxy-3-methylphenyl)fluorene, 9,9-bis(2-hydroxy-5-methylphenyl)fluorene, 9,9-bis(4-hydroxy-3-ethylphenyl)fluorene, 9,9-bis(4-hydroxy-3-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-isobutylphenyl)fluorene and 9,9-bis[4-hydroxy-3-(1-methylpropyl)phenyl]fluorene, and 9,9-bis(hydroxy-di$C_{1-6}$alkylphenyl)fluorenes such as 9,9-bis(4-hydroxy-3,5-dimethylphenyl)fluorene, 9,9-bis(4-hydroxy-2,5-dimethylphenyl)fluorene, 9,9-bis(4-hydroxy-3,5-diethylphenyl)fluorene, 9,9-bis(4-hydroxy-3,5-dipropylphenyl)fluorene, 9,9-bis(4-hydroxy-3,5-diisopropylphenyl)fluorene, 9,9-bis(4-hydroxy-3,5-di-n-butylphenyl)fluorene, 9,9-bis(4-hydroxy-3,5-diisobutylphenyl)fluorene and 9,9-bis[4-hydroxy-3,5-bis(1-methylpropylphenyl)fluorene; (iii) 9,9-bis(hydroxy-cycloalkylphenyl)fluorenes: for example, 9,9-bis(hydroxy-mono$C_{5-8}$cycloalkylphenyl)fluorenes such as 9,9-bis(4-hydroxy-3-cyclohexylphenyl)fluorene; (iv) 9,9-bis(hydroxy-arylphenyl)fluorenes: for example, 9,9-bis(hydroxy-mono$C_{6-8}$arylphenyl)fluorenes such as 9,9-bis(4-hydroxy-3-phenylphenyl)fluorene; (v) 9,9-bis(hydroxy-di$C_{6-8}$arylphenyl)fluorenes such as 9,9-bis(4-hydroxy-3,5-diphenylphenyl)fluorene; (vi) 9,9-bis(hydroxy-aralkylphenyl)fluorenes: for example, 9,9-bis[hydroxy-mono($C_{6-8}$aryl$C_{1-4}$alkyl)phenyl]fluorenes such as 9,9-bis(4-hydroxy-3-benzylphenyl)fluorene; (vii) 9,9-bis[hydroxy-di($C_{6-8}$aryl$C_{1-4}$alkyl)phenyl]fluorenes such as 9,9-bis(4-hydroxy-3,5-dibenzylphenyl)fluorene; (viii) 9,9-bis(hydroxy-alkenylphenyl)fluorenes: for example, 9,9-bis(hydroxy-mono$C_{2-4}$alkenylphenyl)fluorenes such as 9,9-bis(4-hydroxy-3-propenylphenyl)fluorene; and (ix) 9,9-bis(hydroxy-halophenyl)fluorenes: for example, 9,9-bis(hydroxy-monohalophenyl)fluorenes such as 9,9-bis(4-hydroxy-3-fluorophenyl)fluorene.

Out of these, 9,9-bis(hydroxyphenyl)fluorenes and 9,9-bis(hydroxy-mono$C_{1-6}$alkylphenyl)fluorenes are preferred, and 9,9-bis(hydroxy-mono$C_{1-6}$alkylphenyl)fluorenes {such as 9,9-bis(4-hydroxy-3-methylphenyl)fluorene} are particularly preferred.

The compound of the above formula (3) in which k1=k2=0 can be obtained from a reaction with a phenol corresponding to a fluorenone (such as 9-fluorenone). For example, 9,9-bis(4-hydroxyphenyl)fluorene may be obtained from a reaction between a phenol and 9-fluorenone.

(2) compound in which k1=k2=1 or more

Typical examples of the compound represented by the above formula (3) in which k1=k2=1 or more are 9,9-bis(hydroxyalkoxyphenyl)fluorenes.

The 9,9-bis(hydroxyalkoxyphenyl)fluorenes include (i) 9,9-bis(hydroxyalkoxyphenyl)fluorenes: for example, 9,9-bis(hydroxy$C_{2-4}$alkoxyphenyl)fluorenes such as 9,9-bis[4-(2-hydroxyethoxy)phenyl]fluorene, 9,9-bis[4-(3-hydroxypropoxy)phenyl]fluorene and 9,9-bis[4-(4-hydroxybutoxy)phenyl]fluorene; (ii) 9,9-bis(hydroxyalkoxy-alkylphenyl)fluorenes: for example, 9,9-bis(hydroxy$C_{2-4}$alkoxy-mono$C_{1-6}$alkylphenyl)fluorenes such as 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene and 9,9-bis[4-(4-hydroxybutoxy)-3-methylphenyl]fluorene, and 9,9-bis(hydroxy$C_{2-4}$alkoxy-di$C_{1-6}$alkylphenyl)fluorenes such as 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-di-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene and 9,9-bis[4-(4-hydroxybutoxy)-3,5-dimethylphenyl]fluorene, (iii) 9,9-bis(hydroxyalkoxy-cycloalkylphenyl)fluorenes: for example, 9,9-bis(hydroxy$C_{2-4}$alkoxy-mono$C_{5-8}$cycloalkylphenyl)fluorenes such as 9,9-bis[4-(2-hydroxyethoxy)-3-cyclohexylphenyl]fluorene; (ix) 9,9-bis(hydroxyalkoxy-arylphenyl)fluorenes: for example, 9,9-bis(hydroxy$C_{2-4}$alkoxy-mono$C_{6-8}$arylphenyl)fluorenes such as 9,9-bis[4-(2-hydroxyethoxy)-3-phenylphenyl]fluorene; (v) 9,9-bis(hydroxy$C_{2-4}$alkoxy-di$C_{6-8}$arylphenyl)fluorenes such as 9,9-bis[4-(2-hydroxyethoxy)-3,5-diphenylphenyl]fluorene; (vi) 9,9-bis(hydroxyalkoxy-aralkylphenyl)fluorenes: for example, 9,9-bis[hydroxy$C_{2-4}$alkoxy-mono($C_{6-8}$aryl$C_{1-4}$alkyl)phenyl]fluorenes such as 9,9-bis[4-(2-hydroxyethoxy)-3-benzylphenyl]fluorene; (vii) 9,9-bis[hydroxy$C_{2-4}$alkoxy-di($C_{6-8}$aryl$C_{1-4}$alkyl)phenyl]fluorenes such as 9,9-bis[4-(2-hydroxyethoxy)-3,5-dibenzylphenyl]fluorene; (viii) 9,9-bis(hydroxyalkoxy-alkenylphenyl)fluorenes: for example, 9,9-bis(hydroxy$C_{2-4}$alkoxy-mono$C_{2-4}$alkenylphenyl)fluorenes such as 9,9-bis[4-(2-hydroxyethoxy)-3-propenylphenyl]fluorene; (ix) 9,9-bis(hydroxyalkoxy-halophenyl)fluorenes: for example, 9,9-bis(hydroxy$C_{2-4}$alkoxy-monohalophenyl)fluorenes such as 9,9-bis[4-(2-hydroxyethoxy)-3-fluorophenyl]fluorene; and (x) 9,9-bis(hydroxypolyalkoxyphenyl)fluorenes corresponding to the above 9,9-bis(hydroxyalkoxyphenyl)fluorenes in which k1 and k2 are 2 or more.

The compound represented by the formula (3) in which k1=k2=1 or more is obtained by reacting the above 9,9-bis(hydroxyphenyl)fluorene (represented by the formula (3) in which k1=k2=0) with a compound corresponding to the group $R^{1a}$ or $R^{1b}$ (such as alkylene oxide or haloalkanol). For example, 9,9-bis[4-(2-hydroxyethoxy)phenyl]fluorene may be obtained by adding ethylene oxide to 9,9-bis(4-hydroxyphenyl)fluorene, and 9,9-bis[4-(3-hydroxypropoxy)phenyl]fluorene may be obtained by reacting 9,9-bis[4-hydroxyphenyl]fluorene with 3-chloropropanol under an alkaline condition.

The compounds represented by the formula (3) may be used alone or in combination of two or more. Out of the compounds represented by the formula (3), 9,9-bis(hydroxyphenyl)fluorenes, 9,9-bis(hydroxy-mono$C_{1-6}$alkylphenyl)fluorenes, 9,9-bis(hydroxy$C_{2-4}$alkoxyphenyl)fluorenes and 9,9-bis(hydroxy$C_{2-4}$alkoxy-mono$C_{1-6}$alkylphenyl)fluorenes are preferred.

9,9-bis[4-(2-hydroxyethoxy)-3-methylphenyl]fluorene, 9,9-bis(4-hydroxy-3-methylphenyl)fluorene and 9,9-bis[4-(2-hydroxyethoxy)phenyl]fluorene are particularly preferred.

The diol component must include a compound represented by the formula (3) and may include another diol component.

The another diol component is a compound represented by the following formula (4):

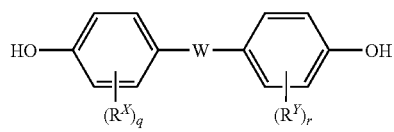

wherein W, $R^X$ and $R^Y$, q and r are as defined in the above formula (2).

Typical examples of the another diol component represented by the above formula (4) include (i) di(hydroxy$C_{6-10}$arenes) such as 4,4'-dihydroxybiphenyl and 4,4'-dihydroxy-3,3'-dichlorobiphenyl; (ii) bis(hydroxyphenyl)$C_{1-5}$alkanes such as bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(4-hydroxy-3-methylphenyl)propane, 2,2-bis(4-hydroxy-3-isopropylphenyl)propane, 2,2-bis(3-t-butyl-4-hydroxypyenyl)propane, 2,2-bis(4-hydroxyphenyl)butane, 4,4-bis(4-hydroxyphenyl)heptane, 2,2-bis(4-hydroxyphenyl)octane, 2,2-bis(3-bromo-4-hydroxyphenyl)propane, 2,2-bis(3,5-dibromo-4-hydroxyphenyl)propane, 2,2-bis(3,5-dichloro-4-hydroxyphenyl)propane and 2,2-bis(3,5-dimethyl-4-hydroxyphenyl)propane; (iii) bis(hydroxyphenyl)cycloalkanes such as 1-bis(4-hydroxyphenyl)-3,3,5-trimethylcyclohexane, 1,1-bis(3-cyclohexyl-4-hydroxyphenyl)cyclohexane, 1,1-bis(4-hydroxyphenyl)cyclohexane and 1,1-bis(4-hydroxyphenyl)cyclopentane, preferably bis(hydroxyphenyl)$C_{5-10}$cycloalkanes, more preferably bis(hydroxyphenyl)$C_{5-8}$cycloalkanes; and (iv) bis(hydroxyphenyl-$C_{1-3}$alkyl)benzenes such as 4,4'-(m-phenylenediisopropylidene)diphenol, 4,4'-(o-phenylenediisopropylidene)diphenol and 4,4'-(p-phenylenediisopropylidene)diphenol.

The diol components represented by the formula (4) may be used alone or in combination of two or more. Preferred examples of the another diol component include (i) bis(hydroxyphenyl)$C_{1-4}$alkanes such as 1,1-bis(4-hydroxyphenyl)-1-phenylethane, 2,2-bis(4-hydroxyphenyl)propane(bisphenol A), 2,2-bis(4-hydroxy-3-methylphenyl)propane and 2,2-bis(3,5-dibromo-4-hydroxyphenyl)propane; (ii) bis(hydroxyphenyl)$C_{5-8}$cycloalkanes such as 1,1-bis(4-hydroxyphenyl)cyclohexane and 1,1-bis(4-hydroxyphenyl)-3,3,5-trimethylcyclohexane; and (iii) bis(hydroxyphenyl-$C_{1-4}$alkyl)benzenes such as 4,4'-(m-phenylenediisopropylidene)diphenol.

A particularly preferred diol component (or a combination of diol components) is, for example, (i) 9,9-bis(hydroxy-mono$C_{1-6}$alkylphenyl)fluorene such as 9,9-bis(4-hydroxy-3-methylphenyl)fluorene; (ii) 9,9-bis(hydroxy$C_{2-4}$alkoxyphenyl)fluorene such as 9,9-bis[4-(2-hydroxyethoxy)phenyl]fluorene; (iii) a combination of a 9,9-bis(hydroxy-mono$C_{1-6}$alkylphenyl)fluorene such as 9,9-bis(4-hydroxy-3-methylphenyl)fluorene and a bis(hydroxyphenyl)alkane such as 2,2-bis(4-hydroxyphenyl)propane, preferably bis(hydroxyphenyl)$C_{1-4}$alkane; or (iv) a combination of a 9,9-bis(hydroxy-mono$C_{1-6}$alkylphenyl)fluorene such as 9,9-bis(4-hydroxy-3-methylphenyl)fluorene and a bis(hydroxyphenyl-alkyl)arene such as 4,4'-(m-phenylenediisopropylidene)diphenol, preferably bis(hydroxyphenyl-$C_{1-4}$alkyl)benzene.

Out of these, (iii) a combination of a 9,9-bis(hydroxy-mono$C_{1-6}$alkylphenyl)fluorene such as 9,9-bis(4-hydroxy-3-methylphenyl)fluorene and a bis(hydroxyphenyl)$C_{1-4}$alkane such as 2,2-bis(4-hydroxyphenyl)propane is particularly preferred.

For example, when 9,9-bis(4-hydroxy-3-methylphenyl)fluorene and 2,2-bis(4-hydroxyphenyl)propane are used as diol components, FLPC containing the recurring unit represented by the formula (1-1) and the recurring unit represented by the following formula (2-1) can be obtained.

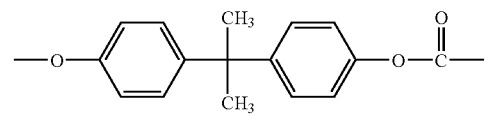

(Carbonate Forming Compound)

The term "carbonate forming compound" which is a raw material of FLPC means a compound capable of forming a carbonate bond. Examples of the carbonate forming compound include phosgenes such as phosgene, diphosgene and triphosgene, and carbonates such as dialkyl carbonates and diaryl carbonates. The dialkyl carbonates include dimethyl carbonate and diethyl carbonate. The diaryl carbonates include diphenyl carbonate and dinaphthyl carbonate. Out of these, phosgene and diphenyl carbonate are preferred. The carbonate forming compounds may be used alone or in combination of two or more.

FLPC can be manufactured by reaction means known per se for manufacturing an ordinary polycarbonate resin. As for the reaction using phosgene as the carbonate forming compound, a reaction between a dihydroxy compound and phosgene may be generally carried out in the presence of an alkali compound such as sodium hydroxide or potassium hydroxide and a solvent such as methylene chloride or chlorobenzene. To promote the reaction, a catalyst such as a tertiary amine exemplified by triethylamine, a quaternary ammonium salt exemplified by tetra-n-butylammonium bromide or a phosphonium salt exemplified by tetra-n-butylphosphonium bromide may be used.

When a carbonic acid diester such as diphenyl carbonate is used as the carbonate forming compound, the dihydroxy compound and the carbonic acid diester may be heated in an inert gas atmosphere to be reacted with each other while the formed alcohol or phenol is distilled off. To promote the reaction, a catalyst which is generally used for an esterification reaction or ester exchange reaction, for example, an alkali metal or alkali earth metal hydroxide such as sodium hydroxide or potassium hydroxide, alkali metal salt or alkali earth metal salt of boron or aluminum hydroxide, quaternary ammonium salt, alkali metal or alkali earth metal organic acid salt, zinc compound, boron compound, silicon compound, germanium compound, tin compound, lead compound, antimony compound, manganese compound, titanium compound or zirconium compound may be used.

A monofunctional phenol which is generally used as a terminal capping agent may be used in the polymerization reaction of FLPC. When a monofunctional phenol is used as the terminal capping agent, the terminal of FLPC can be capped by a group derived from the monofunctional phenol, and FLPC having excellent heat stability can be obtained.

<Coloring Matter Having Infrared Absorptivity>

A coloring matter having infrared absorptivity (IRCM) must have absorption or an absorption range in the infrared region, particularly the near infrared region (for example, about 850 to 1,100 nm). Therefore, the maximum absorption wavelength of IRCM is preferably in the range of 800 to 1,100 nm.

Preferred examples of the coloring matter include (i) polymethine-based coloring matters such as polymethine coloring matters, cyanine coloring matters, azulenium coloring matters, pyrylium coloring matters, squalenium coloring matters and croconium coloring matters, (ii) phthalocyanine coloring matters, (iii) metal chelate-based coloring matters such as indoaniline chelate coloring matters, indonaphthol chelate coloring matters, azo chelate coloring matters and dithiol-based coloring matters, (iv) aminium coloring matters, (v) immonium-based coloring matters such as immonium coloring matters and diimmonium coloring matters, (vi) quinone-based coloring matters such as anthraquinone coloring matters and naphthoquinone coloring matters, and (vii) triphenylmethane-based coloring matters. Out of these infrared absorbing coloring matters, phthalocyanine-based coloring matters, dithiol-based coloring matters (or dithiolene coloring matters) and diimmonium-based coloring matters are preferred.

(Phthalocyanine-Based Coloring Matters)

The phthalocyanine-based coloring matters include a compound represented by the following formula (5).

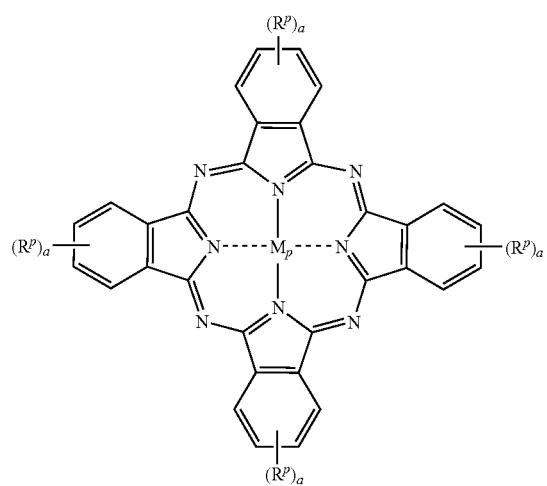

(5)

In the formula (5), $R^p$'s are the same or different and each a halogen atom, alkyl group, alkoxy group, aryl group, aryloxy group, aralkyl group, amino group, amido group, imido group or arylthio group, the group represented by $R^p$ may have a substituent, adjacent $R^p$'s may form a ring with carbon atoms bonded thereto, a is an integer of 0 to 4, $M_p$ is a hydrogen atom, divalent to hexavalent metal atom or oxide thereof, and its valence may be supplemented with a counter anion.

In the formula (5), $R^p$ is a fluorine atom, chlorine atom, alkyl group having 1 to 10 carbon atoms, alkoxy group having 1 to 4 carbon atoms, aryl group having 6 to 10 carbon atoms, aryloxy group having 6 to 10 carbon atoms, aralkyl group having 7 to 14 carbon atoms, amino group, amido group, imido group or arylthio group. The group represented by $R^p$ may have an alkyl group having 1 to 10 carbon atoms, alkylidene group or acyl group as the substituent, a is an integer of 0 to 4, $M_p$ is a hydrogen atom, divalent to hexavalent metal atom or oxide thereof, and its valence may be supplemented with a counter anion.

In the group (such as alkyl group or amino group) represented by $R^p$, the substituent is, for example, a hydrocarbon group. Examples of the hydrocarbon group include alkyl group, cycloalkyl group, aryl group, aralkyl group, alkoxy group, acyl group, halogen atom, hydroxyl group, nitro group, cyano group, amino group and substituted amino group. More specifically, $C_{1-6}$alkyl groups such as methyl group and ethyl group, $C_{5-8}$cycloalkyl groups such as cyclohexyl group, $C_{6-10}$aryl groups such as phenyl group, $C_{6-10}$aryl-$C_{1-4}$alkyl groups such as benzyl group, $C_{1-4}$alkoxy groups such as methoxy group, ethoxy group and butoxy group, $C_{1-6}$acyl groups such as acetyl group, fluorine atom, chlorine atom and mono- and di-alkylamino groups such as dimethylamino group are such examples. The substituents may be used alone or in combination of two or more.

In $R^p$ in the formula (5), examples of the halogen atom include fluorine atom, chlorine atom, bromine atom and iodine atom. The alkyl group is, for example, a $C_{1-20}$alkyl group such as methyl group, t-butyl group, t-amyl group (1,1-dimethylpropyl group) or trifluoromethyl group, preferably $C_{3-10}$alkyl group. The alkoxy group is, for example, a $C_{1-20}$alkoxy group such as butoxy group, preferably $C_{3-10}$alkoxy group. The aryl group is, for example, a $C_{6-10}$aryl group such as phenyl group, preferably $C_{6-8}$aryl group. The aryloxy group is, for example, a $C_{6-10}$aryloxy group such as phenoxy group, preferably $C_{6-8}$aryloxy group. The aralkyl group is, for example, a $C_{6-10}$aryl-$C_{1-4}$alkyl group such as benzyl group, preferably $C_{6-8}$aryl-$C_{1-2}$alkyl group. The amino group is, for example, an amino group or mono- or di-$C_{1-10}$alkylamino group such as dimethylamino group, preferably mono- or di-$C_{1-4}$alkylamino group or alkylideneamino group such as octadecanilideneamino group ($-NH=CH-C_{17}H_{35}$). The amido group is, for example, an acylamido group (acetamido group). The imido group is, for example, a methylphthalimido group. The arylthio group is, for example, a $C_{6-10}$arylthio group such as phenylthio group or p-methylphenylthio group, preferably $C_{6-8}$arylthio group. The adjacent $R^p$'s may form a hydrocarbon ring such as arene ring (benzene ring, etc.) or cycloalkane ring. This ring may have the same substituent (such as alkyl group) as above.

The substitution position of the group $R^p$ is not particularly limited and may be any one of the 3- to 6-positions of the benzene ring.

Examples of the metal atom represented by $M_p$ in the formula (5) include alkali earth metals (such as Mg), the group XIII metals of the periodic table (such as Al), the group XIV metals of the periodic table (such as Si, Ge, Sn and Pb) and transition metals (such as Ti, V, Cr, Mn, Fe, Co, Ni, Cu, Zn, Pd and Rh).

Examples of the counter anion (or the group for supplementing the valence) include hydroxyl group, halide ions (such as chloride ion, bromide ion and iodiode ion), trialkylsilyloxy groups (such as triC$_{1-10}$alkylsilyloxy groups including trihexylsilyloxy), metal acid ions (such as antimonic hexafluoride (SbF$^{6-}$)), and inorganic acid ions (halogenoacid ions such as perchloric acid ion, ions containing phosphorus such as phosphoric hexafluoride ion (PF$^{6-}$) and ions containing boron such as boric tetrafluoride ion (BF$^{4-}$)).

Typical phthalocyanine coloring matters represented by the formula (5) are shown in Table 1 by using a combination of M$_p$, R$^p$, a and counter anion. In Table 1, "H" represents a hydrogen atom, "F" a fluorine atom and "Cl" a chlorine atom.

TABLE 1

| M$_p$ | R$^p$ | a | Counter anion |
|---|---|---|---|
| H | | 0 | — |
| H | t-butyl | 1 | — |
| Cu | F | 4 | — |
| Ti | — | 0 | — |
| Pb | — | 0 | — |
| Cu | two phenylthios and two F's | 4 | — |
| Ni | t-butyl | 1 | — |
| Cu | (CH$_3$)$_2$CCH$_2$C(CH$_3$)$_2$ | 2 | — |
| Mn | t-butyl | 1 | — |
| Cu | dimethylamino | 1 | — |
| H | t-butyl, dimethylamino | 2 | — |
| Cu | dimethylamino | 2 | — |
| TiO | two phenylthios and two F's | 4 | — |
| VO | —NH=CH—C$_{17}$H$_{35}$ | 1 | — |
| Al | amino | 1 | trihexylsilyloxy |
| Al | t-butyl | 1 | hydroxyl group |
| VO | t-butyl | 1 | — |
| Rh | t-butyl | 1 | chloride ion |
| Al | Cl | 4 | chloride ion |
| Si | — | 0 | trihexylsilyloxy |
| Si | Amino | 1 | tributhylsilyloxy |
| Ge | t-butyl | 1 | chloride ion |
| Sn | t-butyl | 1 | iodide ion |
| Sn | two phenylthios and two F's | 4 | chloride ion |

Commercially available products of the above phthalocyanine-based coloring matters (phthalocyanine-based metal complexes) may be used. The commercially available products include Excolor 814K, 810K, 812K, 905B, IR-1, IR-2, IR-3, IR-4, TXEX-805K, TXEX-809K, TXEX-810K, TXEX-811K and TXEX-812K of Nippon Shokubai Co., Ltd. all of which may be advantageously used. The above phthalocyanine-based coloring matters may be used alone or in combination of two or more.

(Dithiol-Based Coloring Matters)

The dithiol-based coloring matters (or dithiolene coloring matters) include a compound represented by the following formula.

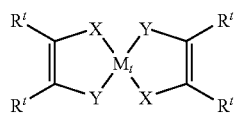

In the above formula, X and Y are the same or different and each an oxygen atom, sulfur atom, NH or NH$_2$, R$^t$'s are the same or different and each a cyano group or phenyl group which may have a substituent, and R$^t$'s substituting adjacent carbon atoms may form a benzene ring or naphthalene ring. M$_t$ is a transition metal atom having 4 ligands, and its valence may be supplemented with a counter anion.

Examples of the transition metal atom M$_t$ having 4 ligands in the above formula include Ti, V, Cr, Co, Ni, Zr, Mo, Fe, Ru, Pd, Os and Pt. M$_t$ is preferably Ni. Examples of the substituent are those enumerated for the above substituent (such as alkyl groups, aryl groups, alkoxy groups, halogen atoms and substituted amino groups such as dimethylamino group).

The preferred dithiol-based coloring matter is, for example, an aromatic dithiol-based metal complex represented by the following formula (6) or (7).

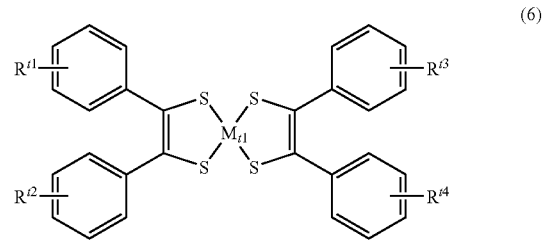

In the formula (6), R$^{t1}$, R$^{t2}$, R$^{t3}$ and R$^{t4}$ are the same or different and each a hydrogen atom, halogen atom, alkyl group, aryl group, aralkyl group, alkoxy group, aryloxy group or amino group, the groups represented by R$^{t1}$, R$^{t2}$, R$^{t3}$ and R$^{t4}$ may have a substituent, and M$_{t1}$ is a transition metal atom having 4 ligands.

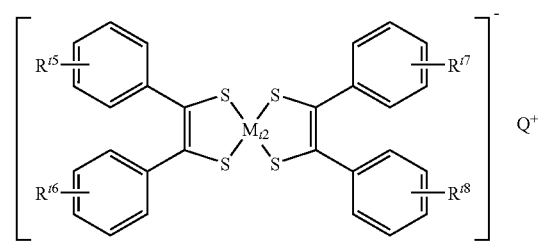

In the formula (7), R$^{t5}$, R$^{t6}$, R$^{t7}$ and R$^{t8}$ are the same or different and each a hydrogen atom, halogen atom, alkyl group, aryl group, aralkyl group, alkoxy group or amino group, the groups represented by R$^{t5}$, R$^{t6}$, R$^{t7}$ and R$^{t8}$ may have a substituent, M$_{t2}$ is a transition metal atom having 4 ligands, and Q$^+$ is a monovalent cation.

In the formulas (6) and (7), preferably, R$^{t1}$, R$^{t2}$, R$^{t3}$, R$^{t4}$, R$^{t5}$, R$^{t6}$, R$^{t7}$ and R$^{t8}$ are each a hydrogen atom, fluorine atom, chlorine atom, bromine atom, iodine atom, alkyl group having 1 to 10 carbon atoms, aryl group having 6 to 10 carbon atoms, aralkyl group having 7 to 14 carbon atoms, alkoxy group having 1 to 10 carbon atoms, amino group, amido group, imido group or arylthio group, the groups represented by R$^{t1}$, R$^{t2}$, R$^{t3}$, R$^{t4}$, R$^{t5}$, R$^{t6}$, R$^{t7}$ and R$^{t8}$ may have an alkyl group having 1 to 10 carbon atoms as a substituent, M$_{t2}$ is a transition metal atom having 4 ligands, and Q$^+$ is a monovalent cation.

Examples of the transition metal atoms having 4 ligands and represented by M$_{t1}$ and M$_{t2}$ in the formulas (6) and (7) include Ti, V, Cr, Co, Ni, Zr, Mo, Fe, Ru, Pd, Os and Pt. Out of these, Ni is particularly preferred.

Examples of the halogen atom in the formulas (6) and (7) include fluorine atom, chlorine atom, bromine atom and iodine atom. The alkyl group is a C$_{1-10}$alkyl group such as methyl group, preferably C$_{1-4}$alkyl group. The aryl group is a $C_{6-10}$aryl group such as phenyl group, dimethylaminophenyl group or methoxyphenyl group, preferably $C_{6-8}$aryl group. The aralkyl group is a $C_{6-10}$aryl-$C_{1-4}$alkyl group such as benzyl group, preferably $C_{6-8}$aryl-$C_{1-2}$alkyl group. The alkoxy group is a $C_{1-10}$alkoxy group such as methoxy group or butoxy group, preferably $C_{1-4}$alkoxy group. The amino group is a mono- or di-$C_{1-10}$alkylamino group such as dimethylamino group or diethylamino group, preferably mono- or di-$C_{1-4}$alkylamino group.

The monovalent cation represented by $Q^+$ in the formula (7) is a tetraalkylammonium ion or cation containing a phosphorus atom. The tetraalkylammonium ion is a tetra$C_{1-10}$ alkylammonium ion such as tetrabutylammonium ion, preferably tetra$C_{1-6}$alkylammonium ion. The cation containing a phosphorus atom is, for example, $(CH_3O)_3P^+$, and tetra$C_{1-4}$ alkylammonium ions are preferred The typical dithiol-based coloring matter repressed by the formula (6) is shown by using a combination of $M_{t1}$, $R^{r1}$, $R^{r2}$, $R^{r3}$ and $R^{r4}$, and the typical dithiol-based coloring matter represented by the formula (7) is shown by using a combination of $M_{t2}$, $R^{r5}$, $R^{r6}$, $R^{r7}$, $R^{r8}$ and $Q^+$ in Table 2. In Table 2, "$Bu_4N^+$" means tetrabutyl ammonium ion.

TABLE 2

| $M_{t1}$ or $M_{t2}$ | $R^{r1}$ to $R^{r4}$ | $R^{r5}$ to $R^{r8}$ | $Q^+$ |
|---|---|---|---|
| Ni | H | — | — |
| Pd | H | — | — |
| Pt | H | — | — |
| Ni | Methoxy group | — | — |
| Ni | — | H | $Bu_4N^+$ |
| Ni | — | Methoxy group | $Bu_4N^+$ |
| Ni | — | H, diethylamino | $Bu_4N^+$ |
| Ni | — | p-methoxyphenyl | $Bu_4N^+$ |
| Ni | — | phenyl and p-methoxyphenyl | $Bu_4N^+$ |
| Fe | — | H | $(CH_3O)_3P^+$ |

Commercially available products of the aromatic dithiol-based metal complexes represented by the formulas (6) and (7) may be used. The commercially available products include MIR-101, MIR-111, MIR-121, MIR-102, MIR-103 and MIR-105 of Midori Kagaku Co., Ltd. all of which can be advantageously used. The dithiol-based coloring matters may be used alone or in combination of two or more. They can be synthesized from a reaction between a transition metal atom having 4 ligands and represented by $M_{t1}$ or $M_{t2}$ and a 1,2-diphenyl-1,2-ethenedithiol. Examples of the 1,2-diphenyl-1,2-ethenedithiol include 1,2-diphenyl-1,2-ethenedithiol and 1,2-di(alkoxyphenyl)-1,2-ethenedithiol (for example, 1,2-di($C_{1-4}$alkoxyphenyl)-1,2-ethenedithiol such as 1,2-di(4-methoxyphenyl)-1,2-ethenedithiol).

The dithiol-based coloring matters may be used alone or in combination of two or more. The aromatic dithiol-based metal complex represented by the above formula (6) or (7) exhibits strong absorption at 850 to 900 nm and intercepts the wavelength of near infrared radiation used for remote controls. Therefore, an infrared absorption filter comprising an aromatic dithiol-based metal complex is effective in preventing the erroneous operation of a remote control.

(Diimmonium-Based Coloring Matters)

The diimmonium-based coloring matters include a compound represented by the following formula (8) or (9).

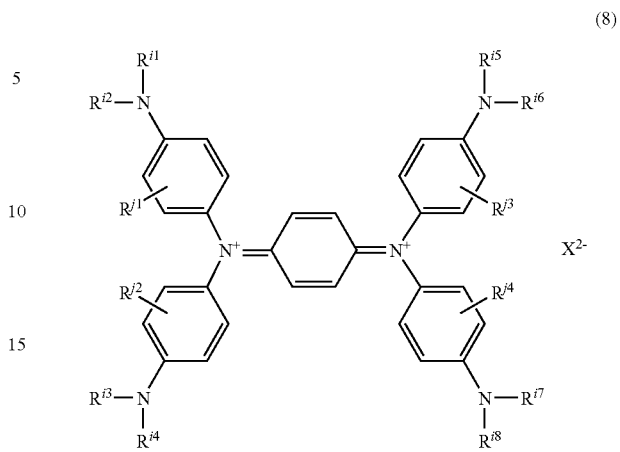

(8)

In the formula (8), $R^{i1}$, $R^{i2}$, $R^{i3}$, $R^{i4}$, $R^{i5}$, $R^{i6}$, $R^{i7}$ and $R^{i8}$ are the same or different and each an alkyl group, $R^{j1}$, $R^{j2}$, $R^{j3}$ and $R^{j4}$ are the same or different and each a hydrogen atom or fluorine atom, and $X^{2-}$ is a divalent anion.

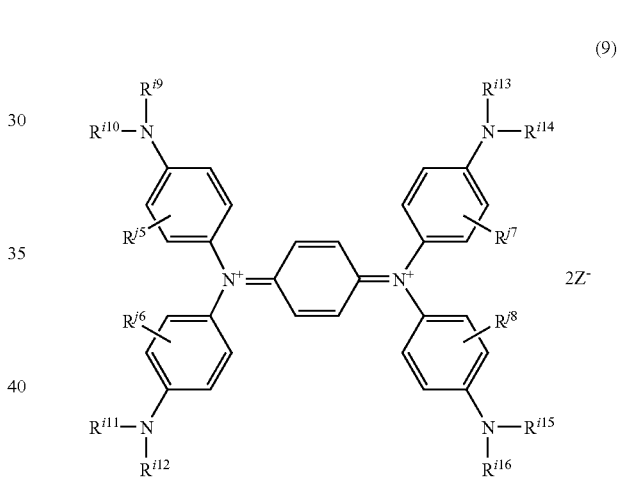

(9)

In the formula (9), $R^{i9}$, $R^{i10}$, $R^{i11}$, $R^{i12}$, $R^{i13}$, $R^{i14}$, $R^{i15}$ and $R^{i16}$ are the same or different and each an alkyl group, $R^{j5}$, $R^{j6}$, $R^{j7}$ and $R^{j8}$ are the same or different and each a hydrogen atom or fluorine atom, and $Z^-$ is a monovalent anion.

In the formulas (8) and (9), preferably, $R^{i9}$, $R^{i10}$, $R^{i11}$, $R^{i12}$, $R^{i13}$, $R^{i14}$, $R^{i15}$ and $R^{i16}$ are each an alkyl group having 1 to 10 carbon atoms, $R^{j1}$, $R^{j2}$, $R^{j3}$, $R^{j4}$, $R^{j5}$, $R^{j6}$, $R^{j7}$ and $R^{j8}$ are the same or different and each a hydrogen atom or fluorine atom, $X^{2-}$ is a divalent anion, and $Z^-$ is a monovalent anion.

In the formula (8) or (9), the alkyl group is a $C_{1-10}$alkyl group such as methyl group, ethyl group, propyl group, butyl group, pentyl group or hexyl group, preferably $C_{1-8}$alkyl group, more preferably $C_{1-6}$alkyl group.

In the formula (8), the divalent anion $X^{2-}$ is, for example, an oxygen ion ($O^{2-}$), inorganic acid ion [such as carbonic acid ion ($CO_3^{2-}$) or sulfuric acid ion ($SO_4^{2-}$)], or organic acid ion [such as oxalic acid ion ($C_2O_4^{2-}$)]. In the formula (9), the monovalent anion $Z^-$ is the same anion as the above counter anion, particularly preferably a metal acid ion (such as antimonic hexafluoride ion ($SbF_6^-$)) or inorganic acid ion (exemplified by halogeno-acid ion such as perchloric acid ion, ion containing phosphorus such as phosphoric hexafluoride ion ($PF_6^-$) or ion containing boron such as boric tetrafluoride ion ($BF_4^-$)).

In the formula (8) or (9), a preferred combination of $R^{i1}$ to $R^{i8}$ (or $R^{i9}$ to $R^{i16}$) and $R^{j1}$ to $R^{j4}$ (or $R^{j5}$ is to $R^{j8}$) is, for example, a combination of butyl group and hydrogen atom, a combination of pentyl group and hydrogen atom, and a combination of butyl group and fluorine atom.

Typical diimmonium-based coloring matters represented by the formula (9) are shown by using a combination of $R^{i9}$ to $R^{i16}$, $R^{j5}$ to $R^{j8}$ and $Z^-$ in Table 3.

TABLE 3

| $R^{i9}$ to $R^{i16}$ | $R^{j5}$ to $R^{j8}$ | $Z^-$ |
| --- | --- | --- |
| Butyl | H | $SbF_6^-$ |
| Pentyl | H | $SbF_6^-$ |
| Butyl | F | $SbF_6^-$ |

Commercially available products of the aromatic dithiol-based metal complex represented by the formula (8) or (9) may be used. The commercially available products include KAYASORB IRG-022 of Nippon Kagaku Co., Ltd. which can be advantageously used. The diimmonium-based coloring matters can be used alone or in combination of two or more.

IRCM's may be used alone or in combination of two or more to constitute the infrared absorption filter of the present invention. It is preferred to use two or more different coloring matters because the infrared absorption wavelength range (particularly near infrared absorption wavelength range) and the maximum absorption wavelength of the coloring matter slightly differ from each other. It is more preferred to use at least two different coloring matters selected from a phthalocyanine-based coloring matter, a dithiol-based coloring matter and a diimmonium-based coloring matter, and it is particularly preferred to use all of the three different coloring matters in combination. Therefore, the coloring matter having infrared absorptivity is preferably a mixture of a phthalocyanine-based coloring matter, a dithiol-based coloring matter and a diimmonium-based coloring matter.

The amount of IRCM is 0.01 to 30 parts by weight, preferably 0.01 to 20 parts by weight, more preferably 0.1 to 15 parts by weight, much more preferably 1 to 10 parts by weight based on 100 parts by weight of FLPC. Particularly when a phthalocyanine-based coloring matter, a dithiol-based coloring matter and/or a diimmonium-based coloring matter are used in combination, the amount of the phthalocyanine-based coloring matter is preferably 0.01 to 3.0 parts by weight, more preferably 0.05 to 2.0 parts by weight, much more preferably 0.1 to 1.5 parts by weight based on 100 parts by weight of FLPC. The amount of the dithiol-based coloring matter is preferably 0.01 to 3.0 parts by weight, more preferably 0.05 to 2.5 parts by weight, much more preferably 0.1 to 2.0 parts by weight. The amount of the diimmonium-based coloring matter is preferably 0.1 to 10 parts by weight, more preferably 0.2 to 8.0 parts by weight, much more preferably 0.5 to 6.0 parts by weight. FLPC as the binder resin constituting the near infrared absorption filter of the present invention can disperse various coloring matters uniformly and can increase the concentration of IRCM based on FLPC.

The amount of IRCM is preferably adjusted based on the thickness of the infrared absorption filter and whether another film (such as electromagnetic wave absorbing layer) which can be used in conjunction with the infrared absorption filter of the present invention has near infrared radiation absorptivity or not. For instance, when IRCM is used in combination with an electromagnetic wave absorbing layer (heat-ray reflection glass) having near infrared reflectivity, it is preferred to use 0.01 to 2.0 parts by weight of a phthalocyanine-based coloring matter, 0.5 to 2.5 parts by weight of a dithiol-based coloring matter and 0.2 to 6.0 parts by weight of a diimmonium-based coloring matter based on 100 parts by weight of FLPC. When the thickness of the infrared absorption film is about 10 µm and an electromagnetic wave absorbing layer incapable of absorbing near infrared radiation is used, it is preferred to use 0.1 to 1.0 part by weight of a phthalocyanine-based coloring matter, 0.5 to 2.0 parts by weight of a dithiol-based coloring matter and 1.0 to 6.0 parts by weight of a diimmonium-based coloring matter based on 100 parts by weight of FLPC. When the contents of the coloring matters are lower than the above ranges, though the transmittance of visible radiation is high, infrared (near infrared) absorption is small and the obtained filter may not function as an infrared absorption filter. When the contents of the above coloring matters are higher than the above ranges, though infrared absorption is large, the transmittance of visible radiation drops disadvantageously.

Therefore, IRCM is preferably at least one coloring matter selected from groups comprising a phthalocyanine-based coloring matter, a dithiol-based coloring matter and a diimmonium-based coloring matter and contained in an amount of 0.01 to 30 parts by weight based on 100 parts by weight of the polycarbonate resin having a fluorene skeleton.

(Coloring Matter for Color Correction)

The infrared absorption filter of the present invention may contain a coloring matter for color correction. That is, a visible absorbing coloring matter for color correction may be used in conjunction with IRCM in the infrared absorption filter of the present invention so as to freely correct the color of the infrared absorption filter. Color correction is particularly important when the infrared absorption filter is used as an infrared absorption filter for displays such as a plasma display.

The visible absorbing coloring matter for color correction may be a coloring matter capable of absorbing visible radiation (especially its visible absorption range is narrow and its transmittance at a wavelength other than that is high). For example, commonly used colorants (for example, dye pigments such as black pigments, red pigments, green pigments and blue pigments) may be used. When IRCM has absorption in the visible region, IRCM may be used as a coloring matter for color correction. Examples of the coloring matter for color correction include cyanine-based coloring matters, quinone-based coloring matters, azo-based coloring matters, indigo-based coloring matters, polyene-based coloring matters (polymethine-based coloring matters), spiro-based coloring matters, porphyrin and phthalocyanine-based coloring matters. These coloring matters for color correction may be used alone or in combination of two or more.

(Light Transmittance)

It is important that the infrared absorption filter of the present invention should have a low light transmittance in the infrared region and further a high light transmittance in other region, especially the visible region, in order to intercept infrared radiation selectively. In the present invention, an infrared absorption filter having a low light transmittance in the infrared region and a high light transmittance in the visible region can be obtained by combining FLPC and IRCM and optionally a coloring matter for color correction.

The infrared absorption filter of the present invention has an average light transmittance at 450 to 700 nm of preferably 55% or more, more preferably 55 to 100%, much more preferably 60 to 99%, particularly preferably 70 to 95%. It has an average light transmittance at 850 to 1,100 nm of preferably 30% or less, more preferably 0 to 30%, much more preferably 0.5 to 15%, particularly preferably 1 to 10%. More specifically, the infrared absorption filter of the present invention preferably has an average light transmittance at 450 to 700 nm of 55% or more and an average light transmittance at 850 to 1,100 nm of 30% or less.

Preferably, IRCM used in the infrared absorption filter of the present invention has a transmittance of a solution prepared by dissolving it in 400 ml of methylene chloride in an amount corresponding to 1 g of FLPC when measured by using a quartz cell having an optical path length of 4 mm of 30% or less at a wavelength of 850 to 1,100 nm and 55% or more at a wavelength of 450 to 700 nm.

The infrared absorption filter of the present invention has excellent environmental resistance. Therefore, the infrared absorption filter of the present invention has an average light transmittance at 450 to 700 nm of preferably 55% or more, more preferably 55 to 100%, much more preferably 60 to 99%, particularly preferably 70 to 95% after an environmental resistance test. The infrared absorption filter has an average light transmittance at 850 to 1,100 nm of preferably 30% or less, more preferably 0 to 30%, much more preferably 0.5 to 15%, particularly preferably 1 to 10% after the environmental resistance test. That is, preferably, the average light transmittance at 450 to 700 nm after the environmental resistance test is 55% or more and the average light transmittance at 850 to 1,100 nm after the environmental resistance test is 30% or less.

The change rate of average light transmittance at 450 to 700 nm before and after the environmental resistance test is preferably 10% or less, more preferably 0 to 10%, much more preferably 0.01 to 5%, particularly preferably 0.05 to 2%. The change rate of average light transmittance at 850 to 1,100 nm before and after the environmental resistance test is preferably 40% or less, more preferably 0 to 40%, much more preferably 0.5 to 35%, particularly preferably 1 to 30%. That is, preferably, the average light transmittance at 450 to 700 nm after the environmental resistance test is 10% or less and the average light transmittance at 850 to 1,100 nm after the environmental resistance test is 40% or less. The environmental resistance test is evaluated by average light transmittance after the filter is treated in a constant-temperature and constant-humidity environment at a temperature of 60° C. and a humidity of 90% for 600 hours.

(Additives)

An antioxidant, heat stabilizer, flame retardant, etc. may be suitably added to the infrared absorption filter of the present invention as required as far as the effect of the present invention is not impaired.

The antioxidant which can be used in the infrared absorption filter of the present invention may be a known antioxidant such as a phenol-based antioxidant, phosphorus-based antioxidant or sulfur-based antioxidant. Out of these, a phenol-based antioxidant is preferred and an alkyl-substituted phenol-based antioxidant is particularly preferred. Specific examples of the phenol-based antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl) propionate, 1,3,5-trimethyl-2,4,6-tris(3,5-di-tert-butyl-4-hydroxybenzyl)benzene, N,N-hexa-methylenebis(3,5-di-tert-butyl-4-hydroxyhydrocinnamide), 3,5-di-tert-butyl-4-hydroxybenzylphosphonate diethyl ester, tris(3,5-di-tert-butyl-4-hydroxybenzyl)isocyanurate, and 3,9-bis{1,1-dimethyl-2-[β-(3-tert-butyl-4-hydroxy-5-meth ylphenyl)propionyloxy]ethyl}-2,4,8,10-tetraoxaspiro(5.5) undecane. These antioxidants may be used alone or in combination of two or more. The amount of the antioxidant is preferably 0.0001 to 0.05 wt % of the total of all the constituent components of the infrared absorption filter.

The heat stabilizer which can be used in the infrared absorption filter of the present invention is preferably a phosphorus-based stabilizer such as a phosphite compound, phosphate compound or phosphonite compound. Examples of the phosphite compound include triphenyl phosphite, trisnonylphenyl phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite and bis(2,4-di-tert-butylphenyl) pentaerythritol diphosphite.

Examples of the phosphate compound include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate.

Examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite and bis(2,4-di-tert-butylphenyl)-4-biphenylene diphosphonite.

Out of these, tris(2,4-di-tert-butylphenyl)phosphite, triphenyl phosphate and trimethyl phosphate are preferred.

These heat stabilizers may be used alone or in combination of two or more. The heat stabilizer is used in an amount of preferably 0.001 to 0.5 wt %, more preferably 0.005 to 0.3 wt % based on the total of all the constituent components of the infrared absorption filter.

Additives such as a flame retardant, ultraviolet light absorber, release agent, antistatic agent, anti-fungus agent, lubricant and filler, and other thermoplastic resins (such as other polycarbonate resins and polyester resins) may be further added to the infrared absorption filter of the present invention in small amounts as far as the effect of the present invention is not impaired.

The infrared absorption filter of the present invention may have any shape or form depend on a purpose, preferably a film-like shape. This film-like infrared absorption filter of the present invention may be a film formed on a substrate or a film alone.

<Manufacture of Infrared Absorption Filter>

The infrared absorption filter of the present invention contains IRCM dispersed in FLPC and may be manufactured or formed by a commonly used method, for example, casting, coating or melt extrusion (extrusion molding) according to its shape or form.

More specifically, the infrared absorption filter of the present invention can be obtained by (i) a casting method in which a coating solution obtained by dispersing IRCM uniformly in an FLPC solution is cast to form a film, (ii) a coating method in which the coating solution is applied to a transparent sheet or film made of glass, styrene-based resin, acrylic resin, amorphous polyolefin resin, cellulose-based resin, polyester resin or FLPC to form a coating film, or (iii) a method in which IRCM and FLPC are blended together and melt extruded into a film.

Out of these, the methods for forming a film by casting or coating, that is, the casting method in which a coating solution obtained by dispersing IRCM uniformly in an FLPC solution is cast to form a film and the coating method in which the coating solution is applied to a transparent film are preferred.

That is, in the ordinary melt extrusion method, the thermal decomposition of a coloring matter may occur as a film is formed at a high temperature of 200° C. or higher. In contrast to this, in the casting method and the coating method, as a film can be formed and dried at a relatively low temperature of 150° C. or lower, the thermal decomposition of IRCM can be suppressed or prevented, and a coloring matter having low heat resistance can be used if it can be dissolved or dispersed uniformly in a solvent.

In the casting method, the coating solution is cast over a glass plate, a planished metal plate or a polyester film, spread over the surface of the plate with a roll having a predetermined space from the plate and dried, and the film is obtained by removing it from the surface by suitable means. In this casting method, the film may be formed by a casting machine. In the coating method, the coating solution is applied to a film or panel by bar coating, spray coating, dip coating or flow coating and dried to form a film layer. To apply the coating solution to the film continuously, various types of roll coaters can be preferably used. In this coating method, a machine which carries out a series of steps of extruding the coating solution from a T die at a regular speed onto a film moving at a predetermined rate (for example, several meters to several tens of meters per minute), removing the solvent in the next drying zone and winding up the film may be employed.

As the solvent for dissolving FLPC and dispersing the coloring matter, which is used in the casting method and the coating method, a solvent which has practical solubility for the resin and the coloring matter, is inactive with the coloring matter and has a practically preferred boiling point may be suitably selected. Examples of the solvent include (i) halogen-based organic solvents such as aliphatic halogen compounds including chloroform, dichloromethane and dichloroethane, and (ii) non-halogen-based organic solvents such as aromatic hydrocarbons including toluene and xylene, ketones including methyl ethyl ketone, acetone, cyclohexanone and cyclopentanone, and ethers including tetrahydrofuran. The solvents may be used alone or in combination of two or more.

The concentration of the coating solution cannot be specified unconditionally because it must be adjusted according to the type of the solvent, the thickness of the filter to be formed and the forming method. However, it may be 1 to 30 wt %, preferably about 5 to 25 wt %.

The thickness of the infrared absorption filter of the present invention cannot be specified unconditionally because it must be suitably adjusted according to the type and concentration of the coloring matter in use. However, it may be 1 to 100 μm, preferably 1 to 50 μm, more preferably 1 to 20 μm.

<Infrared Absorption Panel>

The present invention includes an infrared absorption panel comprising the infrared absorption filter. That is, the infrared absorption filter may be combined with another film or panel capable of absorbing infrared radiation or a film or panel having a specific function to form an infrared absorption panel. The specific function is, for example, electromagnetic wave absorptivity, anti-reflectivity or shape keeping capability.

<Method of Improving Environmental Resistance of Infrared Absorption Filter>

The present invention is a method of improving the environmental resistance of an infrared absorption filter containing a resin having a fluorene skeleton and a coloring matter having infrared absorptivity, wherein a polycarbonate resin containing 20 to 100 mol % of a recurring unit represented by the following formula (1) and 0 to 80 mol % of a recurring unit represented by the following formula (2) is used as the resin having a fluorene skeleton:

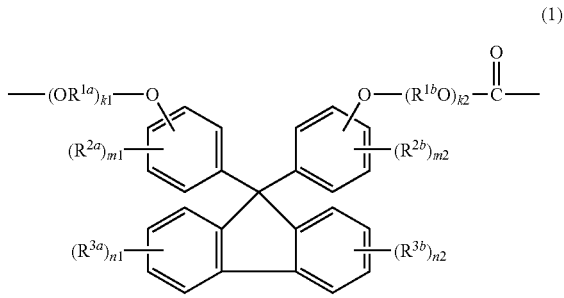

(1)

wherein $R^{1a}$, $R^{1b}$, $R^{2a}$, $R^{2b}$, $R^{3a}$, $R^{3b}$, k1, k2, m1, m2, n1 and n2 are as defined hereinabove,

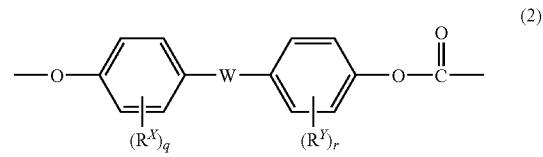

(2)

wherein $R^X$, $R^Y$, q, r and W are as defined hereinabove.

According to the method, when FLPC containing the recurring units represented by the formulas (1) and (2) is used, IRCM can be dispersed into FLPC uniformly in a high concentration and the agglomeration of the coloring matter and a reaction between the coloring matters do not occur. Since IRCM is stabilized in FLPC, the deterioration of IRCM by heat, light and water is markedly suppressed and the environmental resistance of the infrared absorption filter of the present invention is thereby improved.

EXAMPLES

The following examples are provided for the purpose of further illustrating the present invention but are in no way to be taken as limiting. In the examples, "parts" means parts by weight. The evaluation of FLPC and the infrared absorption filter were carried out by the following methods.

(1) viscosity average molecular weight (M): The viscosity average molecular weight (M) is obtained by inserting a specific viscosity (ηsp) obtained from a solution prepared by dissolving a binder resin in methylene chloride to a concentration of 0.7 g/dl at 20° C. into the following equation.

$$\eta sp/C = [\eta] + 0.45 \times [\eta]^2 C$$

$[\eta] = 1.23 \times 10^{-4} M^{0.83}$ (C a resin concentration of 0.7)

(2) film thickness: Part of an infrared absorption filter thin film formed by applying the solution to a glass substrate and drying it is removed with a solvent and the level difference is observed with a tracer type surface profile measuring instrument (dektak of Alback Co., Ltd.) to measure the film thickness.

(3) Existence of agglomeration of coloring matter: The existence of the agglomeration of the coloring matter contained in the infrared absorption filter is checked by observing through an optical microscope at a magnification of 500×.

(4) Average light transmittance at 450 to 700 nm: Light transmittance at 450 to 700 nm is measured with the U-4100 spectrophotometer of Hitachi, Ltd. to obtain an average value.

(5) Average light transmittance at 850 to 1,100 nm: Light transmittance at 850 to 1,100 nm is measured with the U-4100 spectrophotometer of Hitachi, Ltd. to obtain an average value.

(6) Environmental resistance test: The average light transmittance (wavelengths of 450 to 700 nm and 850 to 1,100 nm) after the infrared absorption filter is treated in a constant-temperature and constant-humidity environment at a temperature of 60° C. and a humidity of 90% for 600 hours is compared with the average light transmittance before the above treatment. The change rate of average light transmittance before and after the environmental resistance test is calculated by the following method.

Change rate of average light transmittance(%)={average light transmittance after environmental resistance test/average light transmittance before environmental resistance test}×100−100

Synthesis Example 1

9,810 parts of ion exchange water and 1,930 parts of a 48% aqueous solution of sodium hydroxide were added to a reactor equipped with a thermometer, stirrer and reflux condenser, 1,065 parts of 2,2-bis(4-hydroxyphenyl)propane, 1,177 parts of 9,9-bis(4-hydroxy-3-methylphenyl)fluorene and 4.5 parts of sodium hydrosulfite were dissolved in the resulting solution, 6,610 parts of methylene chloride was added, and 1,000 parts of phosgene was blown into the reactor for 60 minutes under agitation at 16 to 20° C. After phosgene was blown, 50.2 part of p-tert-butylphenol and 317 parts of a 48% aqueous solution of sodium hydroxide were added, and 0.94 part of triethylamine was further added and stirred at 20 to 27° C. for 40 minutes to terminate a reaction. A methylene chloride layer containing the reaction product was washed with diluted hydrochloric acid and pure water, and methylene chloride was evaporated to obtain FLPC. The obtained FLPC contained 40 mol % of a recurring unit having a fluorene skeleton and had a viscosity average molecular weight of 15,500.

Synthesis Example 2

10,120 parts of ion exchange water and 1,857 parts of a 48% aqueous solution of sodium hydroxide were added to a reactor equipped with a thermometer, stirrer and reflux condenser, 512.8 parts of 2,2-bis(4-hydroxyphenyl)propane, 1,984 parts of 9,9-bis(4-hydroxy-3-methylphenyl)fluorene and 4.3 parts of sodium hydrosulfite were dissolved in the resulting solution, 7,632 parts of methylene chloride was added, and 1,000 parts of phosgene was blown into the reactor for 60 minutes under agitation at 16 to 20° C. After phosgene was blown, 33.7 parts of p-tert-butylphenol and 353 parts of a 48% aqueous solution of sodium hydroxide were added, and 0.95 part of triethylamine was further added and stirred at 20 to 27° C. for 40 minutes to terminate a reaction. A methylene chloride layer containing the reaction product was washed with diluted hydrochloric acid and pure water, and methylene chloride was evaporated to obtain FLPC. The obtained FLPC contained 70 mol % of a recurring unit having a fluorene skeleton and had a viscosity average molecular weight of 24,500.

Synthesis Example 3

1,000 parts of 9,9-bis[4-(2-hydroxyethoxy)phenyl]fluorene, 503 parts of diphenyl carbonate, 0.10 part of tetramethylammonium hydroxide and 0.0018 part of sodium hydroxide were fed to a reactor equipped with a stirrer, distiller and decompressor, the inside of the reactor was substituted by nitrogen, and these substances were dissolved at 140° C. After 30 minutes of agitation, a reaction was carried out for 30 minutes by gradually increasing the inside temperature to 180° C. and reducing the pressure to $1.33 \times 10^4$ Pa, and the formed phenol was distilled off. The temperature was kept increased by maintaining the same pressure to distill off phenol at 200° C. for 30 minutes, at 220° C. for 30 minutes, at 240° C. for 30 minutes and further at 260° C. for 20 minutes. Subsequently, the pressure was gradually reduced, stirring was carried out at 260° C. and 133 Pa or less for 4 hours, and the product was taken out from the reactor to obtain FLPC. The obtained FLPC was composed of a fluorene skeleton alone and had a viscosity average molecular weight of 16,100.

Synthesis Example 4

2,235 parts of dimethyl terephthalate, 1,000 parts of ethylene glycol, 4,037 parts of 9,9-bis[4-(2-hydroxyethoxy)phenyl]fluorene and 0.92 part of calcium acetate were fed to a reactor equipped with a thermometer, stirrer and decompressor and gradually heated to be molten under agitation, and an ester interchange reaction was carried out at 180 to 230° C. to distill off methanol. Subsequently, 3.51 parts of di-n-butyltin oxide was added, the temperature was gradually increased to 290° C. and the pressure was reduced to 100 Pa to remove ethylene glycol so as to obtain a polyester resin. The obtained polyester resin had a viscosity average molecular weight of 18,400.

Synthesis Example 5

1,413 parts of dimethyl terephthalate, 606 parts of dimethyl isophthalate, 1,000 parts of ethylene glycol, 1,428 parts of tricyclodecane dimethanol and 0.91 part of antimony trioxide were fed to a reactor equipped with a thermometer, stirrer and decompressor and gradually heated to be molten under agitation, and an ester interchange reaction was carried out at 170 to 220° C. to distill off methanol. Subsequently, the temperature was gradually increased to 260° C. and the pressure was reduced to 100 Pa to remove a fraction so as to obtain a polyester resin. The obtained polyester resin had a viscosity average molecular weight of 19,600.

Example 1

94 parts of FLPC obtained in Synthesis Example 1, 1 part of nickel-bis-1,2-diphenyl-1,2-ethenedithiol (MIR101 of Midori Kagaku Co., Ltd.), 1 part of a phthalocyanine-based coloring matter (Excolor 810K of Nippon Shokubai Co., Ltd.) and 4 parts of a diimmonium-based coloring matter (IRG022 of Nippon Kayaku Co., Ltd.) were added to 341 parts of cyclopentanone and stirred at room temperature for 10 hours to obtain a coating solution. The dispersion state of the coloring matters in the obtained coating solution was satisfactory. This coating solution was applied to a glass plate by spin coating to form a coating film having a thickness of 4.0 μm after drying, and the coating film was dried in an oven at 80° C. for 30 minutes to obtain an infrared absorption filter.

The appearance of the infrared absorption filter was good without unevenness. When the film was observed to check the existence of the agglomeration of the coloring matters, no agglomerate was seen at all. After the light transmittance at 400 to 1,200 nm of this infrared absorption filter was measured and an environmental resistance test was made on the filter, the spectrum of light transmittance was measured again. The spectra of light transmittance before and after the environmental resistance test are shown in FIG. 1. The average light transmittance before and after the environmental resistance test and its change rate are shown in Table 4.

Example 2

Figure 2:
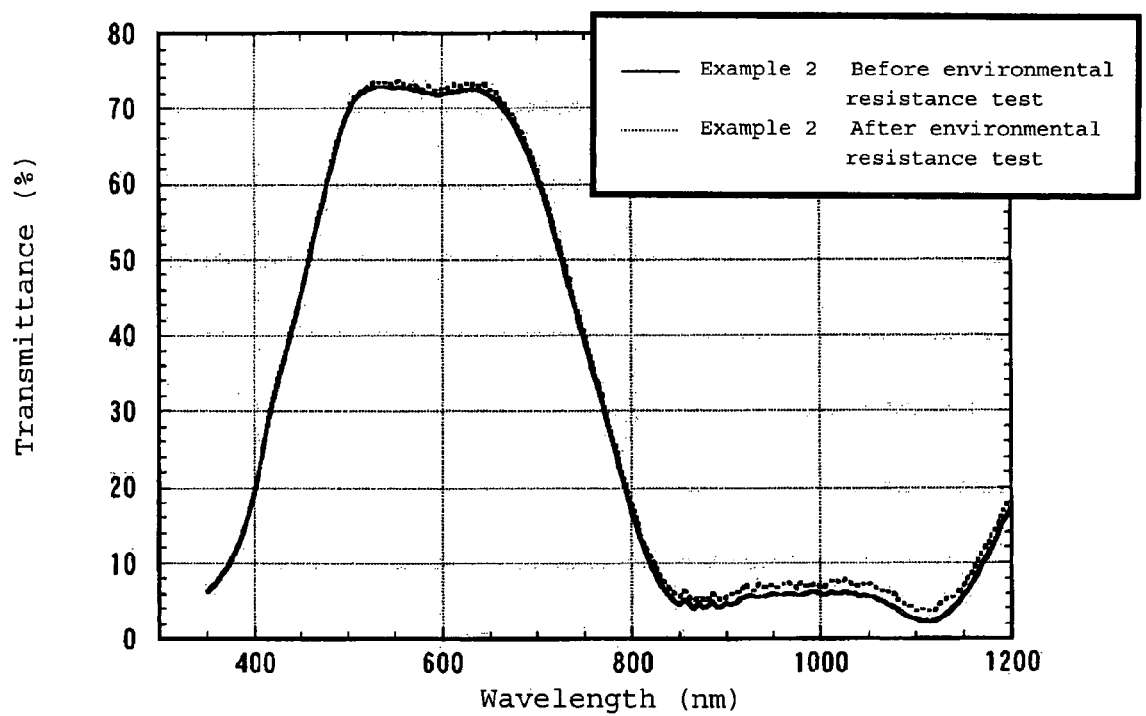
FIG. 2 shows the light transmission spectra before and after an environmental resistance test of the infrared absorption filter obtained in Example 2.

A coating solution was obtained by using FLPC obtained in Synthesis Example 2 to manufacture an infrared absorption filter in the same manner as in Example 1. The coloring matters were dispersed well in the obtained coating solution, and the appearance of the infrared absorption filter was good without unevenness. The results of the same observation and test as in Example 1 are shown in Table 4. After the light transmittance at 400 to 1,200 nm of this infrared absorption filter was measured and an environmental resistance test was made on the filter in the same manner as in Example 1, the spectrum of light transmittance was measured again. The spectra of light transmittance before and after the environmental resistance test are shown in FIG. 2. The average light transmittance before and after the environmental resistance test and its change rate are shown in Table 4.

Example 3

A coating solution was obtained by using FLPC obtained in Synthesis Example 3 to manufacture an infrared absorption filter in the same manner as in Example 1. The coloring matters were dispersed well in the obtained coating solution, and the appearance of the infrared absorption filter was good without unevenness. The results of the same observation and test as in Example 1 are shown in Table 4.

Comparative Example 1

A coating solution was obtained by using the polyester resin obtained in Synthesis Example 4 to manufacture an infrared absorption filter in the same manner as in Example 1. The coloring matters were dispersed well in the obtained coating solution, and the appearance of the infrared absorption filter was good without unevenness. The results of the same observation and test as in Example 1 are shown in Table 4.

Comparative Example 2

A coating solution was obtained by using the Panlite L-1250 (polycarbonate comprising 2,2-bis(4-hydroxyphenyl)propane) of Teijin Chemicals Ltd. to manufacture an infrared absorption filter in the same manner as in Example 1. Although the coloring matters were dispersed well in the obtained coating solution, the agglomeration of the coloring matters was seen in the infrared absorption filter and therefore, the appearance of the filter was not good.

Comparative Example 3

A coating solution was obtained by using the polyester resin obtained in Synthesis Example 5 to manufacture an infrared absorption filter in the same manner as in Example 1. Although the coloring matters were dispersed well in the obtained coating solution, the agglomeration of the coloring matters was seen in the infrared absorption filter and therefore, the appearance of the filter was not good. The results are shown in Table 4.

TABLE 4

| | Content of recurring unit represented by formula (1) (mol %) | Agglomeration | Before environmental resistance test | | After environmental resistance test | | Change rate in average light transmittance before and after environmental resistance test | |
|---|---|---|---|---|---|---|---|---|
| | | | Average light transmittance at 450 to 700 nm (%) | Average light transmittance at 850 to 1,100 nm (%) | Average light transmittance at 450 to 700 nm (%) | Average light transmittance at 850 to 1,100 nm (%) | Change rate at 450 to 700 nm (%) | Change rate at 850 to 1,100 nm (%) |
| Ex. 1 | 40 | Not seen | 67.0 | 4.2 | 67.3 | 5.2 | 0.4 | 23.8 |
| Ex. 2 | 70 | Not seen | 68.1 | 5.1 | 68.7 | 6.4 | 0.9 | 25.5 |
| Ex. 3 | 100 | Not seen | 70.3 | 5.2 | 70.4 | 6.1 | 0.1 | 17.3 |
| C. Ex. 1 | 0 | Not seen | 71.4 | 4.8 | 73.2 | 38.5 | 2.5 | 702.1 |
| C. Ex. 2 | 0 | Seen | 70.8 | 71.3 | 71.0 | 71.8 | 0.3 | 0.7 |
| C. Ex. 3 | 0 | Seen | 68.5 | 68.8 | 68.7 | 69.1 | 0.3 | 0.4 |

Ex.: Example
C. Ex.: Comparative Example

As obvious from Table 4, the infrared absorption filters obtained in Examples 1 to 3 are free from the agglomeration of the coloring matters and has excellent infrared absorptivity with a high average light transmittance for visible radiation (450 to 700 nm) and a low average light transmittance for infrared radiation (850 to 1,100 nm). Further, as obvious from FIG. 1 and FIG. 2, the deterioration of infrared absorptivity caused by the environmental resistance test is not seen. Meanwhile, although the infrared absorption filter obtained in Comparative Example 1 shows the same level of infrared absorptivity as those of Examples, its deterioration caused by the environmental resistance test is seen. Further, as for the comparison of the change rate of average light transmittance before and after the environmental resistance test, the change rates of Examples 1 to 3 are much lower than that of Comparative Example 1. Therefore, the infrared absorption filters obtained in Examples 1 to 3 are superior in environmental resistance. In Comparative Examples 2 and 3, the coloring matters agglomerated and uniform infrared absorption filters could not be obtained.

INDUSTRIAL FEASIBILITY

The infrared absorption filter of the present invention is free from the agglomeration of a coloring matter and a reaction between coloring matters because IRCM can be dispersed in FLPC uniformly in a high concentration. Therefore, the interception of infrared radiation and the transmission of visible radiation can be realized with a film as thin as several tens of μm. Since IRCM is stabilized in FLPC, the deterioration of IRCM by heat, light and water is markedly suppressed and accordingly, the infrared absorption filter of the present invention can maintain stable performance for a long time.

Consequently, the infrared absorption filter and infrared absorption panel of the present invention can be used in a wide variety of fields which require high performance and durability. For example, since the infrared absorption filter of the present invention can absorb infrared rays radiated from image output equipment and lighting equipment, it can be used as an infrared absorption filter for preventing the erroneous operation of remote control equipment such as a remote control which uses light in the infrared region for communication and an infrared communication port. It can also be advantageously used as an infrared absorption filter used to correct the reception sensitivity or color of the light receiving device or image pick-up device of optical equipment.

More specifically, the infrared absorption filter of the present invention can be advantageously used as an infrared absorption filter for plasma displays, plasma display front panels, solid image sensor (CCD) cameras and photodiodes.

The invention claimed is:

1. An infrared absorption filter consisting essentially of a polycarbonate resin having a fluorene skeleton and a coloring matter having infrared absorptivity, wherein
the polycarbonate resin having a fluorene skeleton contains 20 to 100 mol % of a recurring unit represented by the following formula (1):

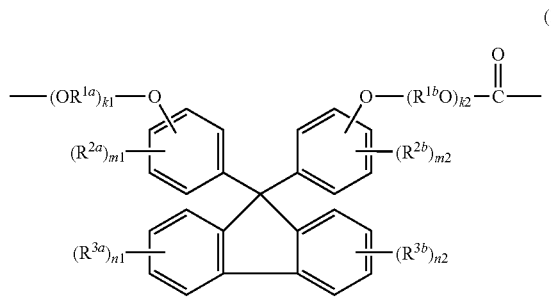

wherein $R^{1a}$ and $R^{1b}$ are the same or different and each an alkylene group having 2 to 10 carbon atoms, $R^{2a}$, $R^{2b}$, $R^{3a}$ and $R^{3b}$ are the same or different and each a hydrocarbon group having 1 to 10 carbon atoms or halogen atom, k1 and k2 are the same or different and each an integer of 0 to 2, and m1, m2, n1 and n2 are the same or different and each an integer of 0 to 4, and 0 to 80 mol % of a recurring unit represented by the following formula (2):

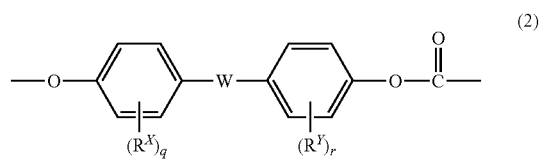

wherein $R^X$ and $R^Y$ are the same or different and each a hydrogen atom or alkyl group having 1 to 4 carbon atoms, q and r are each independently 1 or 2, and W is a single bond, alkylidene group having 1 to 5 carbon atoms, cycloalkylidene group having 5 to 10 carbon atoms or di(alkylidene having 1 to 3 carbon atoms) phenylene group.

2. The infrared absorption filter according to claim 1, wherein, in the formula (1), $R^{1a}$ and $R^{1b}$ are the same or different and each an alkylene group having 2 to 4 carbon atoms, $R^{2a}$, $R^{2b}$, $R^{3a}$ and $R^{3b}$ are the same or different and each an alkyl group having 1 to 10 carbon atoms, k1 and k2 are the same or different and each 0 or 1, and m1, m2, n1 and n2 are the same or different and each an integer of 0 to 2.

3. The infrared absorption filter according to claim 1, wherein, in the formula (1), $R^{1a}$ and $R^{1b}$ are each an ethylene group, $R^{2a}$, $R^{2b}$, $R^{3a}$ and $R^{3b}$ are the same or different and each an alkyl group having 1 to 4 carbon atoms, k1 and k2 are the same or different and each 0 or 1, m1 and m2 are the same or different and each 0 or 1, and n1 and n2 are each 0.

4. The infrared absorption filter according to claim 1, wherein the recurring unit represented by the formula (1) has a structure represented by the following formula (1-1)

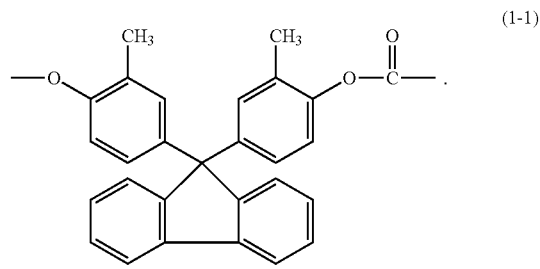

5. The infrared absorption filter according to claim 1, wherein the recurring unit represented by the formula (1) has a structure represented by the following formula (1-2)

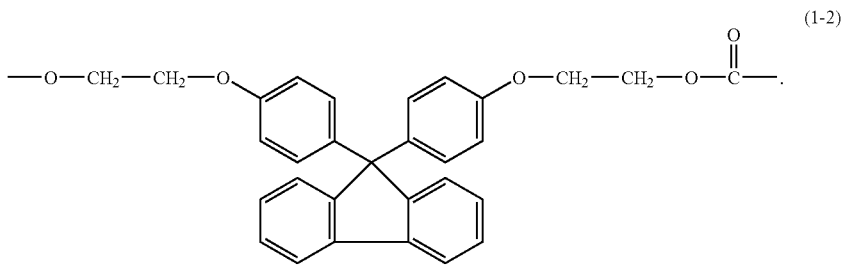

6. The infrared absorption filter according to claim 1, wherein W in the formula (2) is a single bond, alkylidene group having 1 to 4 carbon atoms, cycloalkylidene group having 6 to 9 carbon atoms or di(alkylidene having 1 to 3 carbon atoms)phenylene group, and $R^X$ and $R^Y$ are each a hydrogen atom.

7. The infrared absorption filter according to claim 1, wherein W in the formula (2) is an isopropylidene group and/or a group represented by the following formula, and $R^X$ and $R^Y$ are each a hydrogen atom

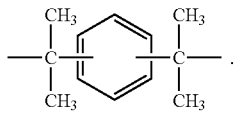

8. The infrared absorption filter according to claim 1 which contains 30 to 100 mol % of the recurring unit represented by the formula (1) and 0 to 70 mol % of the recurring unit represented by the formula (2).

9. The infrared absorption filter according to claim 1, wherein the coloring matter having infrared absorptivity is at least one coloring matter selected from the group consisting of a phthalocyanine-based coloring matter, a dithiol-based coloring matter and a diimmonium-based coloring matter and contained in an amount of 0.01 to 30 parts by weight based on 100 parts by weight of the polycarbonate resin having a fluorene skeleton.

10. The infrared absorption filter according to claim 1, wherein the maximum absorption wavelength of the coloring matter having infrared absorptivity is 800 to 1,100 nm.

11. The infrared absorption filter according to claim 1, wherein the coloring matter having infrared absorptivity is a mixture of a phthalocyanine-based coloring matter, a dithiol-based coloring matter and a diimmonium-based coloring matter.

12. The infrared absorption filter according to claim 1, wherein the coloring matter having infrared absorptivity has a transmittance of a solution prepared by dissolving it in 400 ml of methylene chloride in an amount corresponding to 1 g of polycarbonate resin having a fluorene skeleton when measured by using a quartz cell having an optical path length of 4 mm of 30% or less at a wavelength of 850 to 1,100 nm and 55% or more at a wavelength of 450 to 700 nm.

13. The infrared absorption filter according to claim 9, wherein the phthalocyanine-based coloring matter is a coloring matter represented by the following formula (5):

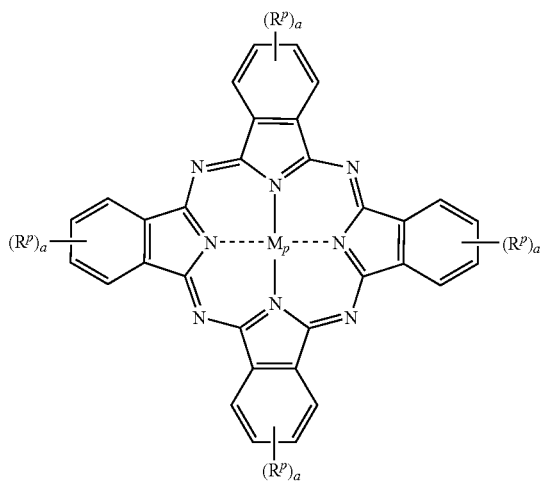

wherein $R^p$'s are the same or different and each a halogen atom, alkyl group, alkoxy group, aryl group, aryloxy group, aralkyl group, amino group, amido group, imido group or arylthio group, the group represented by $R^p$ may have a substituent, adjacent $R^p$'s may form a ring with carbon atoms bonded thereto, a is an integer of 0 to 4, $M_p$ is a hydrogen atom, divalent to hexavalent metal atom or an oxide thereof, and its valence may be supplemented with a counter anion.

14. The infrared absorption filter according to claim 13, wherein, in the formula (5), $R^p$ is a fluorine atom, chlorine atom, alkyl group having 1 to 10 carbon atoms, alkoxy group having 1 to 4 carbon atoms, aryl group having 6 to 10 carbon atoms, aryloxy group having 6 to 10 carbon atoms, aralkyl group having 7 to 14 carbon atoms, amino group, amido group, imido group or arylthio group, the group represented by $R^p$ may have an alkyl group having 1 to 10 carbon atoms, alkylidene group or acyl group as the substituent, a is an integer of 0 to 4, $M_p$ is a hydrogen atom, divalent to hexavalent metal atom or oxide thereof, and its valence may be supplemented with a counter anion.

15. The infrared absorption filter according to claim 9, wherein the dithiol-based coloring matter is at least one coloring matter selected from the group consisting of a coloring matter represented by the following formula (6):

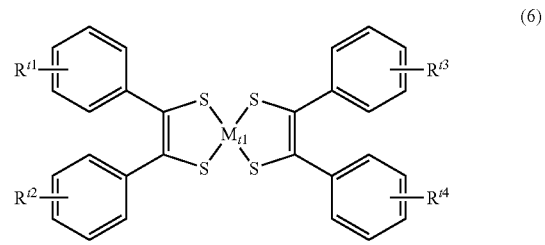

wherein $R^{t1}$, $R^{t2}$, $R^{t3}$ and $R^{t4}$ are the same or different and each a hydrogen atom, halogen atom, alkyl group, aryl group, aralkyl group, alkoxy group, aryloxy group or amino group, the groups represented by $R^{t1}$, $R^{t2}$, $R^{t3}$ and $R^{t4}$ may have a substituent, and $M_{t1}$ is a transition metal atom having 4 ligands, and a coloring matter represented by the following formula (7):

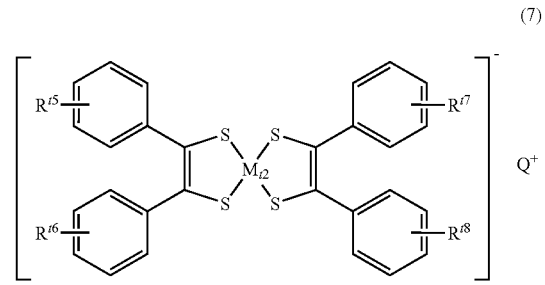

wherein $R^{t5}$, $R^{t6}$, $R^{t7}$ and $R^{t8}$ are the same or different and each a hydrogen atom, halogen atom, alkyl group, aryl group, aralkyl group, alkoxy group or amino group, the groups represented by $R^{t5}$, $R^{t6}$, $R^{t7}$ and $R^{t8}$ may have a substituent, $M_{t2}$ is a transition metal atom having 4 ligands, and $Q^+$ is a monovalent cation.

16. The infrared absorption filter according to claim 15, wherein, in the formulas (6) and (7), $R^{t1}$, $R^{t2}$, $R^{t3}$, $R^{t4}$, $R^{t5}$, $R^{t6}$, $R^{t7}$ and $R^{t8}$ are each a hydrogen atom, fluorine atom, chlorine atom, bromine atom, iodine atom, alkyl group having 1 to 10 carbon atoms, aryl group having 6 to 10 carbon atoms, aralkyl group having 7 to 14 carbon atoms, alkoxy group having 1 to 10 carbon atoms, amino group, amido group, imido group or arylthio group, the groups represented by $R^{t1}$, $R^{t2}$, $R^{t3}$, $R^{t4}$, $R^{t5}$, $R^{t6}$, $R^{t7}$ and $R^{t8}$ may have an alkyl group having 1 to 10 carbon atoms as the substituent, $M_{t2}$ is a transition metal atom having 4 ligands, and $Q^+$ is a monovalent cation.

17. The infrared absorption filter according to claim 9, wherein the diimmonium-based coloring matter is at least one coloring matter selected from the group consisting of a coloring matter represented by the following formula (8):

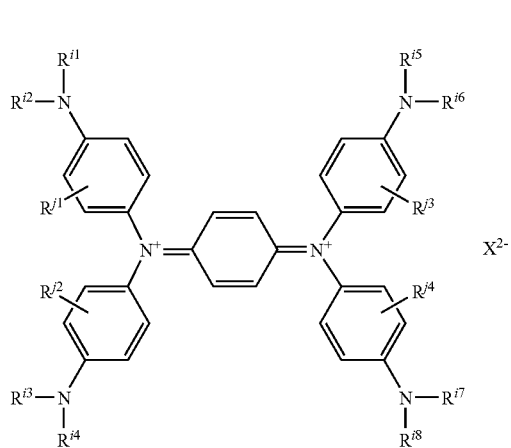

(8)

wherein $R^{i1}$, $R^{i2}$, $R^{i3}$, $R^{i4}$, $R^{i5}$, $R^{i6}$, $R^{i7}$ and $R^{i8}$ are the same or different and each an alkyl group, $R^{j1}$, $R^{j2}$, $R^{j3}$ and $R^{j4}$ are the same or different and each a hydrogen atom or fluorine atom, and $X^{2-}$ is a divalent anion, and a coloring matter represented by the following formula (9):

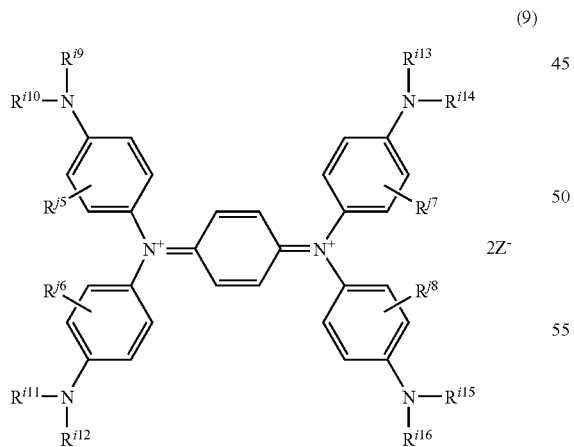

(9)

wherein $R^{i9}$, $R^{i10}$, $R^{i11}$, $R^{i12}$, $R^{i13}$, $R^{i14}$, $R^{i15}$ and $R^{i16}$ are the same or different and each an alkyl group, $R^{j5}$, $R^{j6}$, $R^{j7}$ and $R^{j8}$ are the same or different and each a hydrogen atom or fluorine atom, and $Z^-$ is a monovalent anion.

18. The infrared absorption filter according to claim 17, wherein, in the formulas (8) and (9), $R^{i9}$, $R^{i10}$, $R^{i11}$, $R^{i12}$, $R^{i13}$, $R^{i14}$, $R^{i15}$ and $R^{i16}$ are each an alkyl group having 1 to 10 carbon atoms, $R^{j1}$, $R^{j2}$, $R^{j3}$, $R^{j4}$, $R^{j5}$, $R^{j6}$, $R^{j7}$ and $R^{j8}$ are the same or different and each a hydrogen atom or fluorine atom, $X^{2-}$ is a divalent anion, and $Z^-$ is a monovalent anion.

19. The infrared absorption filter according to claim 1, wherein the amount of the coloring matter having infrared absorptivity is 0.01 to 30 parts by weight based on 100 parts by weight of the polycarbonate resin having a fluorene skeleton.

20. The infrared absorption filter according to claim 1 which has an average light transmittance at 450 to 700 nm of 55% or more and an average light transmittance at 850 to 1,100 nm of 30% or less.

21. The infrared absorption filter according to claim 1 which has an average light transmittance at 450 to 700 nm after an environmental resistance test of 55% or more and an average light transmittance at 850 to 1,100 nm after the environmental resistance test of 30% or less.

22. The infrared absorption filter according to claim 1 which has a change rate of average light transmittance at 450 to 700 nm before and after an environmental resistance test of 10% or less and a change rate of average light transmittance at 850 to 1,100 nm before and after the environmental resistance test of 40% or less.

23. The infrared absorption filter according to claim 1 which further contains a coloring matter for color correction.

24. The infrared absorption filter according to claim 1 which is in the form of a film.

25. The infrared absorption filter according to claim 1 which is a film formed by a casting or coating method.

26. An infrared absorption panel comprising the infrared absorption filter of claim 1.

27. A method of improving the environmental resistance of an infrared absorption filter consisting essentially of a polycarbonate resin having a fluorene skeleton and a coloring matter having infrared absorptivity, the method comprising the steps of casting or coating a solution containing the polycarbonate resin and the coloring matter on a substrate to form a film, and drying the film to form the infrared absorption filter, wherein the polycarbonate resin having a fluorine skeleton contains 20 to 100 mol % of a recurring unit represented by the following formula (1):

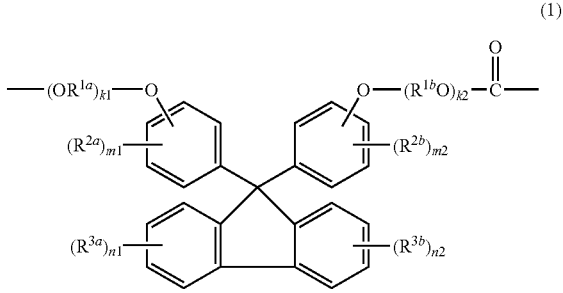

(1)

wherein $R^{1a}$ and $R^{1b}$ are the same or different and each an alkylene group having 2 to 10 carbon atoms, $R^{2a}$, $R^{2b}$, $R^{3a}$ and $R^{3b}$ are the same or different and each a hydrocarbon group having 1 to 10 carbon atoms, hydrogen atom or halogen atom, k1 and k2 are the same or different and each an integer of 0 to 2, and m1, m2, n1 and n2 are the same or different and each an integer of 0 to 4, and 0 to 80 mol % of a recurring unit represented by the following formula (2):

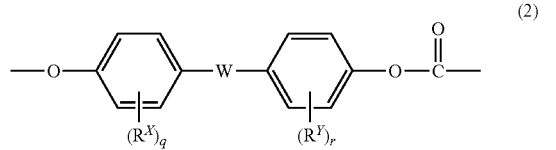
(2)
wherein $R^X$ and $R^Y$ are the same or different and each a hydrogen atom or alkyl group having 1 to 4 carbon atoms, q and r are each independently 1 or 2, and W is a single bond, alkylidene group having 1 to 5 carbon atoms, cycloalkylidene group having 5 to 10 carbon atoms or di(alkylidene having 1 to 3 carbon atoms) phenylene group.
* * * * *